(12) United States Patent
Kuno et al.

(10) Patent No.: US 12,741,457 B2
(45) Date of Patent: Sep. 22, 2026

(54) SHEET PROCESSING APPARATUS AND IMAGE FORMING SYSTEM INCORPORATING THE SHEET PROCESSING APPARATUS

(71) Applicants: Satoshi Kuno, Tokyo (JP); Ryohsuke Akaishi, Kanagawa (JP); Yasunobu Kidoura, Kanagawa (JP); Hirofumi Horita, Kanagawa (JP); Naohiro Yoshida, Kanagawa (JP)

(72) Inventors: Satoshi Kuno, Tokyo (JP); Ryohsuke Akaishi, Kanagawa (JP); Yasunobu Kidoura, Kanagawa (JP); Hirofumi Horita, Kanagawa (JP); Naohiro Yoshida, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 64 days.

(21) Appl. No.: 18/676,710

(22) Filed: May 29, 2024

(65) Prior Publication Data

US 2024/0399729 A1 Dec. 5, 2024

(30) Foreign Application Priority Data

May 31, 2023 (JP) ................................ 2023-089495

(51) Int. Cl.
*B32B 37/00* (2006.01)
*B32B 37/06* (2006.01)
(Continued)

(52) U.S. Cl.
CPC .......... *B32B 37/0053* (2013.01); *B32B 37/06* (2013.01); *B32B 38/10* (2013.01);
(Continued)

(58) Field of Classification Search
CPC ... B32B 37/0053; B32B 37/06; B32B 37/142; B32B 37/185; B32B 38/10; B32B 38/18;
(Continued)

(56) References Cited

U.S. PATENT DOCUMENTS 11,292,240 B2 * 4/2022 Akiyama .............. B32B 43/006
11,385,588 B2 * 7/2022 Nozaki ............. G03G 15/6585
(Continued)

FOREIGN PATENT DOCUMENTS

JP 2006-160429 A 6/2006
JP 2012-121728 A 6/2012
(Continued)

*Primary Examiner* — Alex B Efta
*Assistant Examiner* — Alexander S Wright
(74) *Attorney, Agent, or Firm* — Harness, Dickey & Pierce, P.L.C.

(57) ABSTRACT

A sheet processing apparatus includes a conveyance passage, a sheet separation device, and a conveyance roller pair. The conveyance passage conveys a two-ply sheet having two sheets overlapped and bonded together in a conveyance direction and includes a first branched conveyance passage branched in a first direction, and a second branched conveyance passage branched in a second direction different from the first direction. The sheet separation device separates a non-bonding portion of the two-ply sheet, conveys a first sheet of the two sheets separated from each other to the first branched conveyance passage, and conveys convey a second sheet of the two sheets separated from each other to the second branched conveyance passage. The conveyance roller pair has two rollers that are separable from and contactable with each other, and are disposed on at least one of the first branched conveyance passage or the second branched conveyance passage.

18 Claims, 23 Drawing Sheets

(51) Int. Cl.

| | |
|---|---|
| ***B32B 38/10*** | (2006.01) |
| ***B65H 5/06*** | (2006.01) |
| ***B65H 29/64*** | (2006.01) |
| ***B65H 39/02*** | (2006.01) |

(52) U.S. Cl.
CPC ............. *B65H 5/062* (2013.01); *B65H 29/64* (2013.01); *B65H 39/02* (2013.01); *B32B 2037/0061* (2013.01); *B32B 2307/4023* (2013.01); *B32B 2309/70* (2013.01); *B65H 2404/144* (2013.01); *B65H 2404/632* (2013.01)

(58) Field of Classification Search
CPC .... B32B 2037/0061; B32B 2307/4023; B32B 2309/70; B65H 5/062; B65H 29/64; B65H 39/02; B65H 2404/144; B65H 2404/632; B65H 2801/27
See application file for complete search history.

(56) References Cited

U.S. PATENT DOCUMENTS

| | | | | |
|---|---|---|---|---|
| 11,845,254 | B2 * | 12/2023 | Furuhashi | B32B 37/0046 |
| 2022/0291620 | A1 | 9/2022 | Fujita et al. | |
| 2023/0244164 | A1 | 8/2023 | Kidoura et al. | |
| 2023/0256726 | A1 | 8/2023 | Kunieda et al. | |
| 2023/0264461 | A1 | 8/2023 | Kuno et al. | |
| 2023/0264491 | A1 | 8/2023 | Horita et al. | |
| 2023/0264909 | A1 | 8/2023 | Kawakami et al. | |
| 2023/0303352 | A1 | 9/2023 | Akaishi et al. | |
| 2023/0312283 | A1 * | 10/2023 | Oishi | B65H 9/166 271/272 |
| 2024/0399729 | A1 * | 12/2024 | Kuno | B32B 38/10 |

FOREIGN PATENT DOCUMENTS

| | | | |
|---|---|---|---|
| JP | 2018-203478 | A | 12/2018 |
| JP | 2022-139612 | A | 9/2022 |

* cited by examiner

FIG. 13
109
111
116a
110
113
108
117
A
r
P1
S
FIG. 14
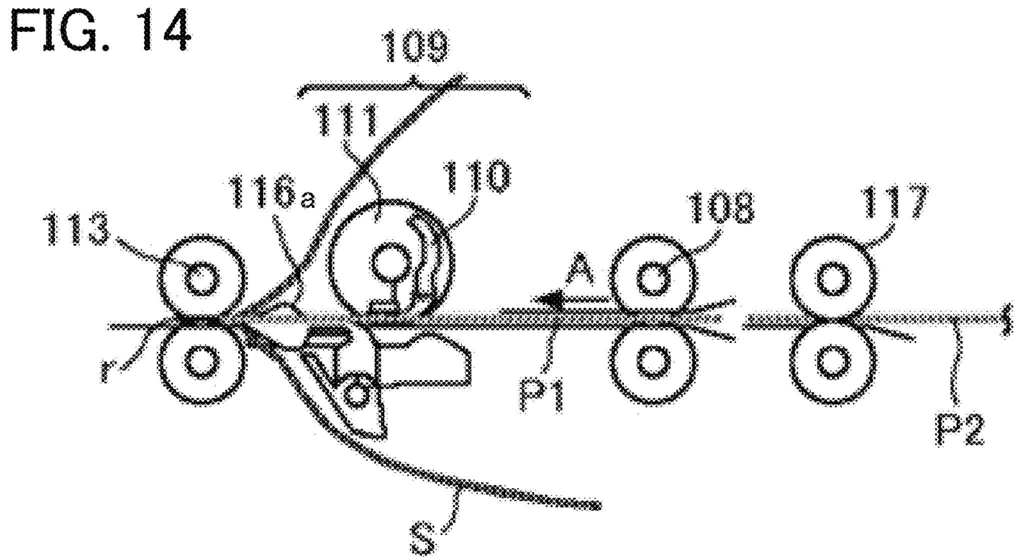
FIG. 15
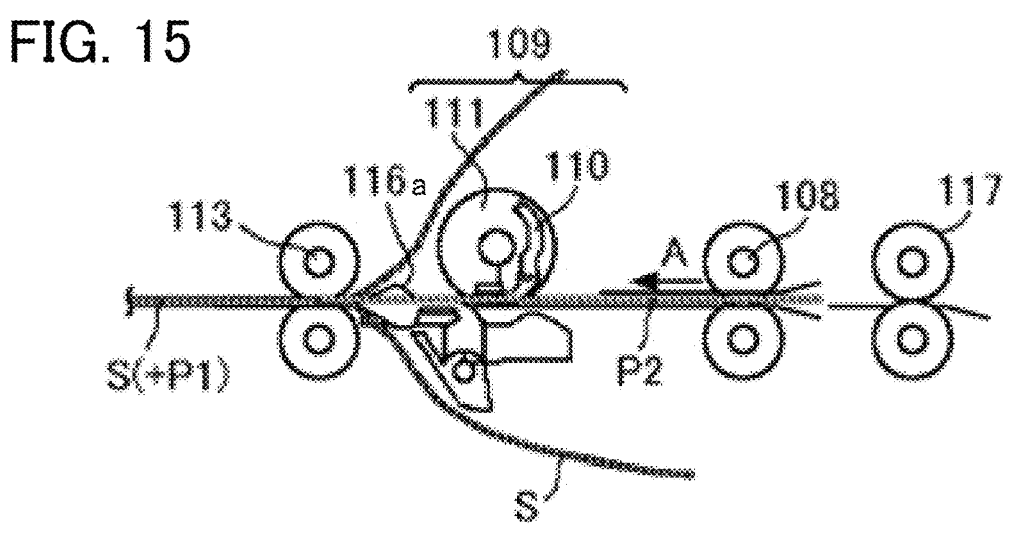

FIG. 16
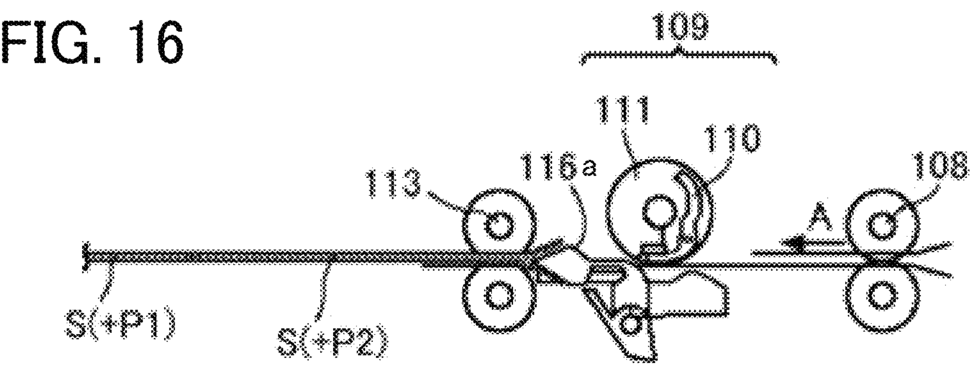
FIG. 17
109
111
110
113
116a
108
A
118
FIG. 18
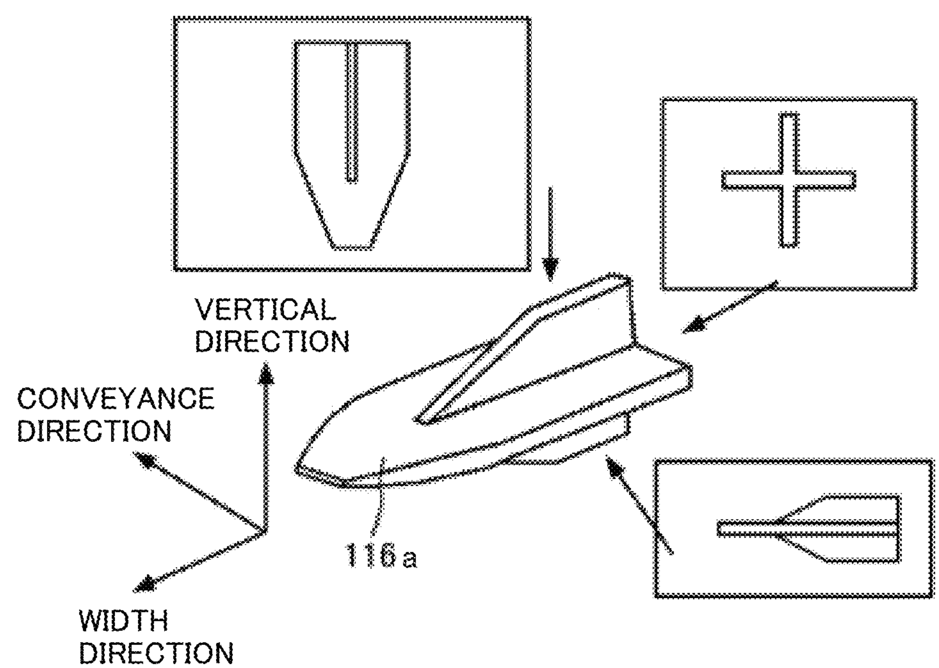

FIG. 30

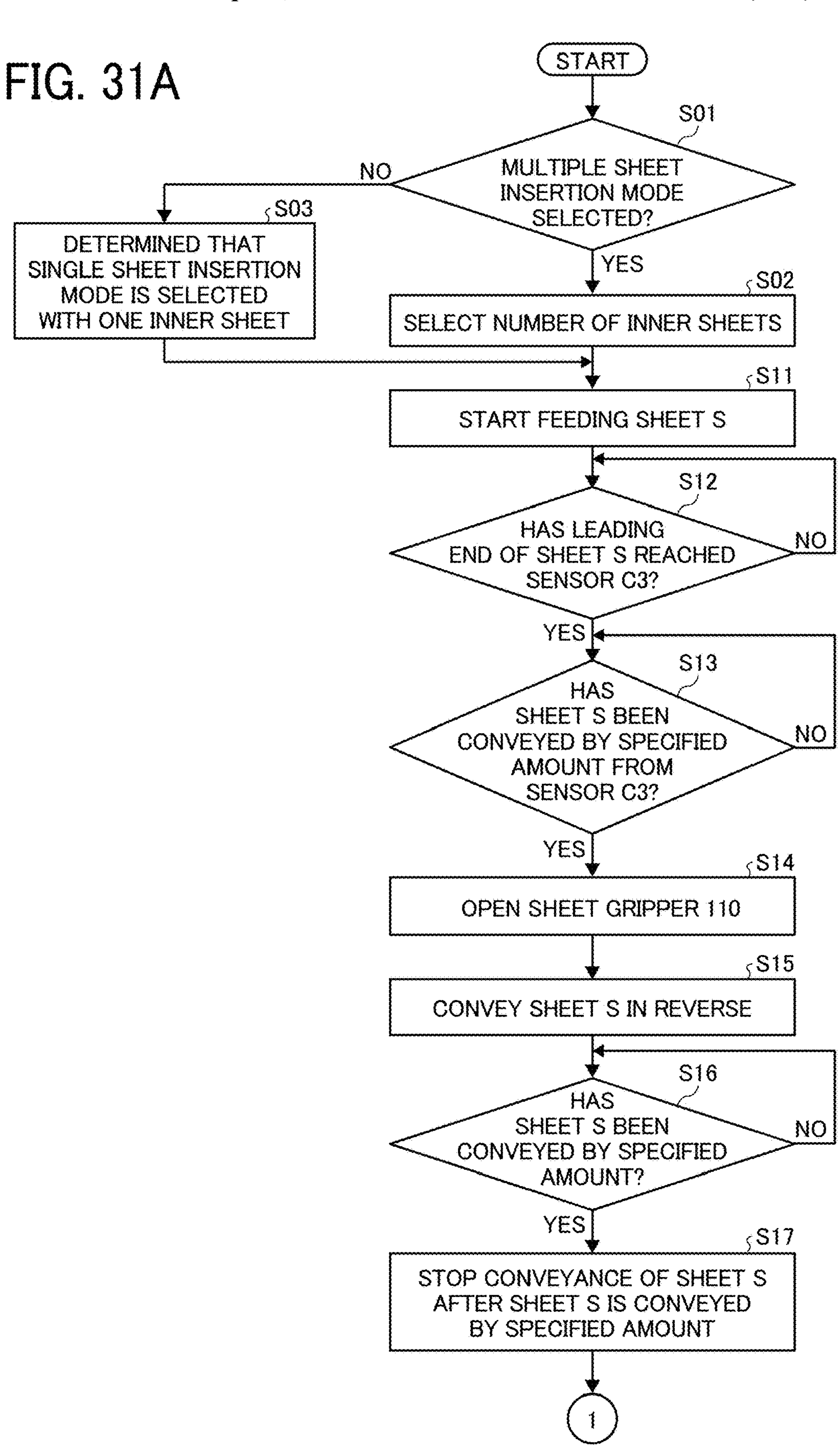
FIG. 31A
START
S01
MULTIPLE SHEET INSERTION MODE SELECTED?
NO
YES
S03
DETERMINED THAT SINGLE SHEET INSERTION MODE IS SELECTED WITH ONE INNER SHEET
S02
SELECT NUMBER OF INNER SHEETS
S11
START FEEDING SHEET S
S12
HAS LEADING END OF SHEET S REACHED SENSOR C3?
NO
YES
S13
HAS SHEET S BEEN CONVEYED BY SPECIFIED AMOUNT FROM SENSOR C3?
NO
YES
S14
OPEN SHEET GRIPPER 110
S15
CONVEY SHEET S IN REVERSE
S16
HAS SHEET S BEEN CONVEYED BY SPECIFIED AMOUNT?
NO
YES
S17
STOP CONVEYANCE OF SHEET S AFTER SHEET S IS CONVEYED BY SPECIFIED AMOUNT
1

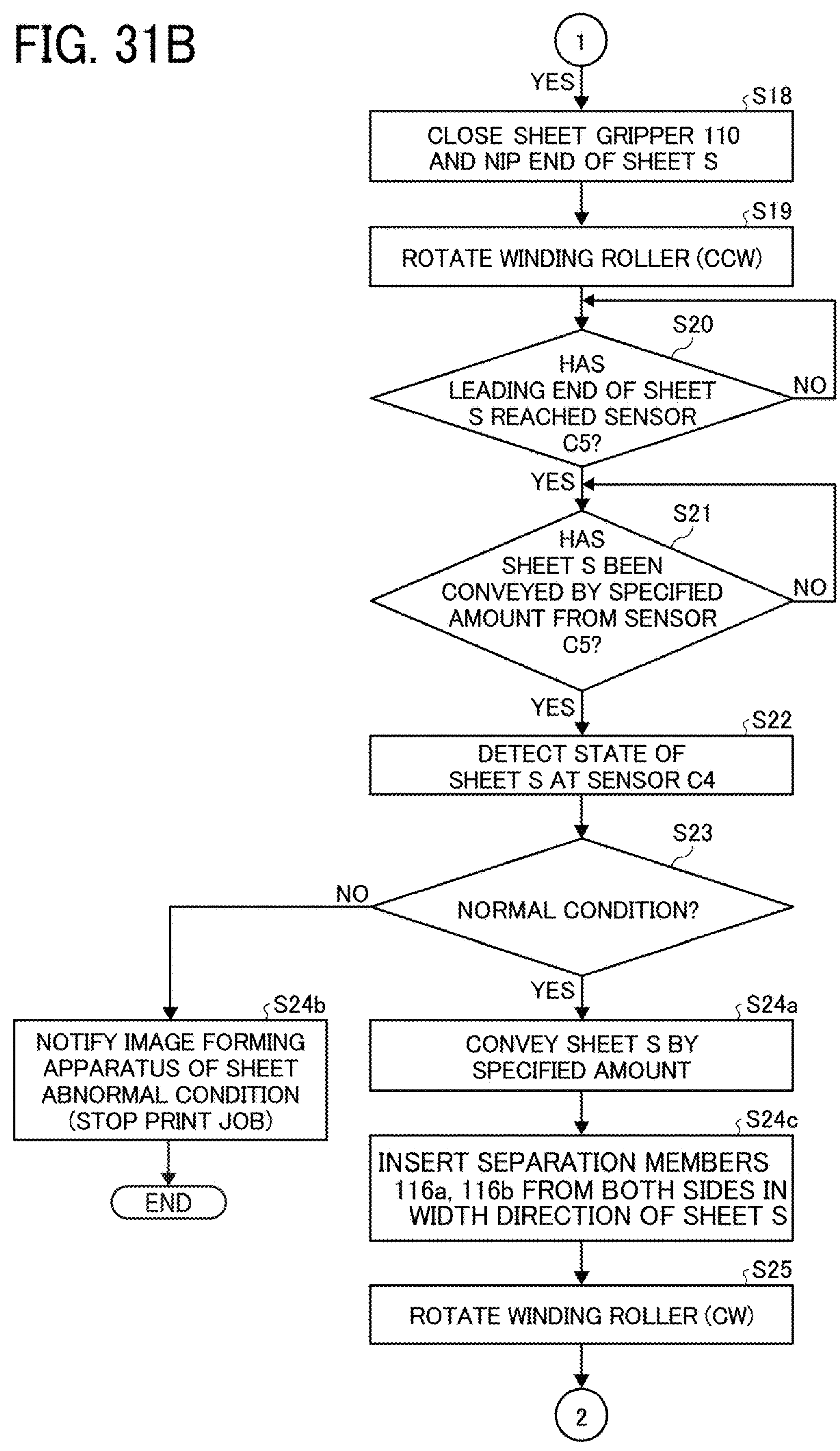
FIG. 31B
1
YES
S18
CLOSE SHEET GRIPPER 110 AND NIP END OF SHEET S
S19
ROTATE WINDING ROLLER (CCW)
S20
HAS LEADING END OF SHEET S REACHED SENSOR C5?
NO
YES
S21
HAS SHEET S BEEN CONVEYED BY SPECIFIED AMOUNT FROM SENSOR C5?
NO
YES
S22
DETECT STATE OF SHEET S AT SENSOR C4
S23
NORMAL CONDITION?
NO
YES
S24b
NOTIFY IMAGE FORMING APPARATUS OF SHEET ABNORMAL CONDITION (STOP PRINT JOB)
END
S24a
CONVEY SHEET S BY SPECIFIED AMOUNT
S24c
INSERT SEPARATION MEMBERS 116a, 116b FROM BOTH SIDES IN WIDTH DIRECTION OF SHEET S
S25
ROTATE WINDING ROLLER (CW)
2

SHEET PROCESSING APPARATUS AND IMAGE FORMING SYSTEM INCORPORATING THE SHEET PROCESSING APPARATUS

CROSS-REFERENCE TO RELATED APPLICATION

This patent application is based on and claims priority pursuant to 35 U.S.C. § 119 (a) to Japanese Patent Application No. 2023-089495, filed on May 31, 2023, in the Japan Patent Office, the entire disclosure of which is hereby incorporated by reference herein.

BACKGROUND

Technical Field

Embodiments of the present disclosure relate to a sheet processing apparatus that separates the non-bonding portion of a two-ply sheet in which two sheets are overlapped and bonded together at the bonding portion of the two-ply sheet, and an image forming system including the sheet processing apparatus.

Background Art

Various types of sheet processing apparatuses in the related art are known that separate a two-ply sheet in which two sheets are overlapped and bonded together at one ends as a bonding portion and insert an inner sheet between the two sheets separated from each other. Specifically, a sheet processing apparatus in the related art separates (peels), to some extent, two sheets of a laminated sheet (e.g., a two-ply sheet) in which one sides of the two sheets are bonded at sheet of the laminated sheet, conveys one of the two sheets (first sheet) to a first branched conveyance passage (branched conveyance), then conveys the other of the two sheets (second sheet) to a second branched conveyance passage (branched conveyance), so that the two sheets are largely separated. Then, an inner sheet is inserted between the two sheets thus largely separated from each other.

Such a sheet processing apparatus in the related art has a relatively large interval between a pair of branching guide plates defining a branched conveyance passage (the distance between guide plates), so as not to cause a failure (conveyance failure) in which a two-ply sheet is caught in the first branched conveyance passage and the second branched conveyance passage when the two sheets of the two-ply sheet are branched and separated.

SUMMARY

Embodiments of the present disclosure described herein provide a novel sheet processing apparatus including a conveyance passage, a sheet separation device, and a conveyance roller pair. The conveyance passage conveys a two-ply sheet having two sheets overlapped and bonded together at a bonding portion in a conveyance direction. The conveyance passage includes a first branched conveyance passage branched in a first direction and a second branched conveyance passage branched in a second direction different from the first direction. The sheet separation device separates a non-bonding portion of the two-ply sheet, conveys a first sheet of the two sheets separated from each other to the first branched conveyance passage, and conveys a second sheet of the two sheets separated from each other to the second branched conveyance passage. The conveyance roller pair has two rollers that are separable from and contactable with each other, and are disposed on at least one of the first branched conveyance passage or the second branched conveyance passage.

Further, embodiments of the present disclosure described herein an image forming system including the above-described sheet processing apparatus, and an image forming apparatus to form an image on an inner sheet to be conveyed to the sheet processing apparatus.

Further, embodiments of the present disclosure described herein a sheet laminator including the above-described sheet processing apparatus, and a thermal fixer to perform a sheet laminating operation on the two-ply sheet having an inner sheet inserted between the two sheets by the sheet separation device.

Further, embodiments of the present disclosure described herein an image forming system including the above-described sheet laminator, and an image forming apparatus to form an image on an inner sheet to be conveyed to the sheet laminator.

BRIEF DESCRIPTION OF THE SEVERAL VIEWS OF THE DRAWINGS

Exemplary embodiments of this disclosure will be described in detail based on the following figures, wherein:

FIG. 13 is a schematic diagram illustrating sheet separation performed by the sheet separation device, subsequent from the sheet separation of FIG. 12;

FIG. 14 is a schematic diagram illustrating sheet separation performed by the sheet separation device, subsequent from the sheet separation of FIG. 13;

FIG. 15 is a schematic diagram illustrating sheet separation performed by the sheet separation device, subsequent from the sheet separation of FIG. 14;

FIG. 16 is a schematic diagram illustrating sheet separation performed by the sheet separation device, subsequent from the sheet separation of FIG. 15;

FIG. 17 is a schematic diagram illustrating sheet separation performed by the sheet separation device, subsequent from the sheet separation of FIG. 16;

FIG. 18 is a perspective view of a separation member;

FIG. 30 is a block diagram illustrating a hardware configuration of a control block of the sheet laminator to control the operation of the sheet laminator;

FIG. 31 including FIGS. 31A, 31B and 31C is a flowchart of a flow of a control process executed in the sheet processing apparatus;

FIGS. 34A and 34B are schematic diagrams illustrating the operations of contact and separation mechanism of FIGS. 33A and 33B, viewed from above.

Figure 1:
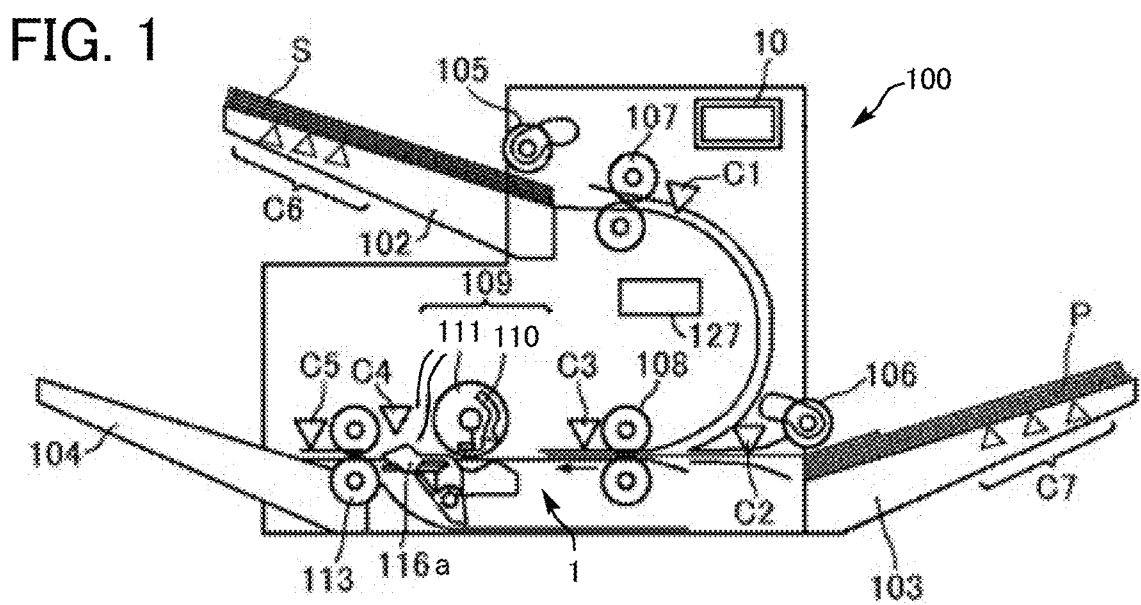
FIG. 1 is a schematic diagram illustrating an overall configuration of a sheet processing apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items. Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the present disclosure are described below in detail with reference to the drawings. In the drawings, the same or corresponding parts are denoted by the same reference numerals, and redundant description thereof are simplified or omitted as appropriate.

A description is given of a sheet processing apparatus according to an embodiment of the present disclosure, with reference to FIG. 1.

FIG. 1 is a schematic diagram illustrating an overall configuration of a sheet processing apparatus according to an embodiment of the present disclosure.

A sheet processing apparatus 100 according to the present embodiment is to separate two sheets of a two-ply sheet and to insert and grip (nip) a sheet-shaped medium between the two sheets separated from each other. The two sheets include a first sheet S1 and a second sheet S2 (see the drawings including FIGS. 32A and 32B). The two-ply sheet is referred to as a lamination sheet S and the sheet-shaped medium is referred to as an inner sheet P.

The lamination sheet S is a two-ply sheet in which two sheets are overlapped and bonded together at a portion (or a side) of the two-ply sheet. In other words, the lamination sheet S is a two-ply sheet in which two sheet are overlapped and bonded together at a bonding portion "r" of the two-ply sheet. For example, the lamination sheet S (two-ply sheet) has two sheets (two sides). A first side of the lamination sheet S functions as a transparent sheet such as a transparent polyester sheet, a second side of the lamination sheet S functions as a transparent or opaque sheet disposed facing the first side, and the first and second sides are bonded at one side of the lamination sheet S. The lamination sheet S (two-ply sheet) also includes a lamination film.

The inner sheet P (insertion sheet) is a sheet medium to be inserted into the lamination sheet S (two-ply sheet), between the first sheet S1 and the second sheet S2 of the lamination sheet S. Examples of the inner sheet P include plain paper, thick paper, postcards, envelopes, thin paper, coated paper, art paper, tracing paper, and overhead projector (OHP) transparencies.

As illustrated in FIG. 1, the sheet processing apparatus 100 includes a sheet tray 102, a pickup roller 105, and a conveyance roller pair 107. The sheet tray 102 functions as a first sheet stacker on which the lamination sheet S is placed. The pickup roller 105 feeds the lamination sheet S from the sheet tray 102. The sheet processing apparatus 100 further includes a sheet tray 103 as a second sheet stacker on which the inner sheet P is stacked, and a pickup roller 106 that feeds the inner sheet P from the sheet tray 103.

The sheet tray 102 includes a sheet size sensor C6 that functions as a sheet size detector to detect the size of the lamination sheet S, in other words, the length of the lamination sheet S in the sheet conveyance direction. The sheet tray 103 includes a sheet size sensor C7 that serves as a medium size detector to detect the size of the inner sheet P, in other words, the length of the inner sheet P in the sheet conveyance direction.

Each of the sheet size sensor C6 and the sheet size sensor C7 includes multiple sensors arranged side by side in the sheet conveyance direction. Since the detection results of the sensors change depending on the size of the stacked lamination sheets S (or the inner sheet P), the sheet size sensors C6 and C7 can detect the length of the lamination sheet S (or the inner sheet P) in the sheet conveyance direction.

A conveyance sensor C1 is disposed downstream from the conveyance roller pair 107 in the sheet conveyance direction to detect the sheet conveyance position of the lamination sheet S.

A conveyance sensor C2 is disposed downstream from the pickup roller 106 in the sheet conveyance direction to detect the sheet conveyance position of the inner sheet P. The sheet conveyance sensors C1 and C2 may be used to detect the length of the lamination sheet S (or the inner sheet P) in the sheet conveyance direction.

The sheet processing apparatus 100 further includes an entrance roller pair 108 as a first conveyor, a winding roller 109 as a rotator, an exit roller pair 113 as a second conveyor, and a sheet ejection tray 104. The entrance roller pair 108, the winding roller 109, the exit roller pair 113, and the sheet ejection tray 104 are disposed downstream from the conveyance roller pair 107 and the pickup roller 106 in the sheet conveyance direction. The sheet processing apparatus 100 further includes separation members **116*a* and 116*b* that are movable between the winding roller 109 and the exit roller pair 113. The separation members 116*a* and 116*b*** are disposed to be movable in the width direction of the lamination sheet S.

A sheet conveyance sensor C3 is disposed downstream from the entrance roller pair 108 in the sheet conveyance direction to detect the sheet conveyance position of the lamination sheet S and the sheet conveyance position of the inner sheet P.

An abnormal condition detection sensor C4 is disposed downstream from the winding roller 109 in the sheet conveyance direction to detect the condition of the lamination sheet S.

A sheet conveyance sensor C5 is disposed downstream from the exit roller pair 113 in the sheet conveyance direction to detect the sheet conveyance position of the lamination sheet S.

The pickup roller 105, the conveyance roller pair 107, the entrance roller pair 108, and the winding roller 109 are examples of a first feeder to feed a lamination sheet. The pickup roller 106, the entrance roller pair 108 and the winding roller 109 are examples of a second feeder.

A control panel 10 is provided on the exterior of the sheet processing apparatus 100. The control panel 10 serves as an operation device or a display-operation device to display information of the sheet processing apparatus 100 and receives input of the operation of the sheet processing apparatus 100. The control panel 10 also serves as a notification device to output a perceptual signal to a user. As an alternative, a notification device other than the control panel 10 may be separately provided in the sheet processing apparatus 100.

The sheet processing apparatus 100 according to the present embodiment stacks lamination sheets S and inner sheets P on separate trays. When a lamination sheet S is being conveyed, the sheet processing apparatus 100 separates and opens the lamination sheet S into two sheets, which are the first sheet S1 and the second sheet S2, and inserts the inner sheet P between the first sheet S1 and the second sheet S2 of the lamination sheet S. The exit roller pair 113 ejects and stacks the lamination sheet S, in which the inner sheet P has been inserted, onto the sheet ejection tray 104.

Figure 2:
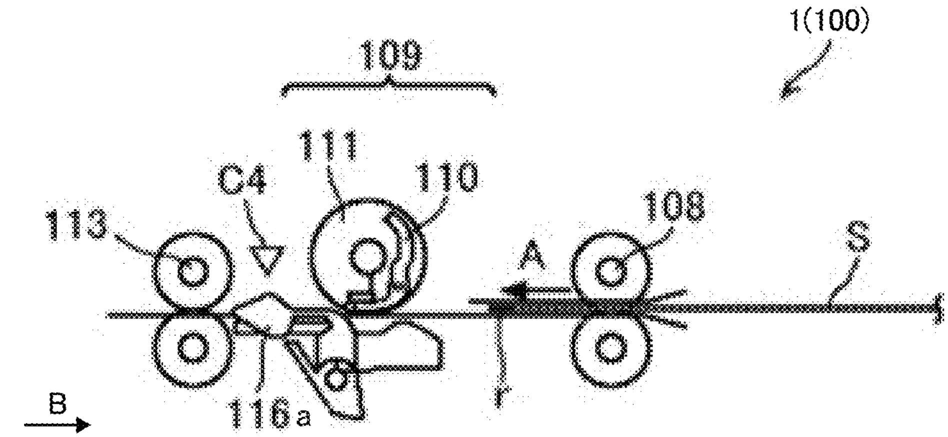
FIG. 2 is a diagram illustrating sheet separation performed by a sheet separation device included in the sheet processing apparatus of FIG. 1.

FIG. 2 is a diagram illustrating the main part (the sheet separation device 1) of the sheet processing apparatus 100 of FIG. 1.

As illustrated in FIG. 2, each of the entrance roller pair 108 and the exit roller pair 113 is, for example, two rollers paired with each other and driven by a driver such as a motor. Specifically, the entrance roller pair 108 is driven and rotated by an entrance roller pair motor **108*a* serving as a driver (see FIG. 30), and the exit roller pair 113 is driven and rotated by an exit roller pair motor 113*a* (see FIG. 30). The entrance roller pair 108 rotates in one direction. The exit roller pair 113** rotates in forward and reverse directions. By so doing, the lamination sheet S and the inner sheet P are nipped and conveyed.

The entrance roller pair 108 conveys the lamination sheet S and the inner sheet P toward the exit roller pair 113. The sheet conveyance direction indicated by arrow A in FIG. 2 is hereinafter referred to as a "forward conveyance direction" or a sheet conveyance direction A.

On the other hand, the exit roller pair 113 can switch the direction of rotation between the forward conveyance direction and a direction opposite to the forward conveyance direction. The exit roller pair 113 conveys the lamination sheet S nipped by the rollers of the exit roller pair 113 toward the sheet ejection tray 104 (see FIG. 1) in the forward conveyance direction and also conveys the lamination sheet S toward the winding roller 109 in the direction opposite the forward conveyance direction (to convey the lamination sheet S in reverse). The sheet conveyance direction of the lamination sheet S toward the winding roller 109 (in other words, the direction opposite to the forward conveyance direction) indicated by arrow B in FIG. 2 is hereinafter referred to as an opposite conveyance direction or a sheet conveyance direction B.

The sheet processing apparatus 100 further includes a sheet separation device 1 between the entrance roller pair 108 and the exit roller pair 113. The sheet separation device 1 includes the winding roller 109 functioning as a rotary member or a rotator and the separation members 116*a* and 116*b*. The winding roller 109 is driven by a winding roller motor 109*a* (see FIG. 30) to rotate in the forward and reverse (opposite) conveyance directions. The direction of rotation of the winding roller 109 is switchable between the forward conveyance direction (clockwise direction) and the opposite conveyance direction (counterclockwise direction).

The winding roller 109 includes a roller 111 and a sheet gripper 110 movably disposed on the roller 111 to grip the lamination sheet S. The sheet gripper 110 is driven by a sheet gripper motor 110*a* (see FIG. 30) to be rotatable with the roller 111. The sheet gripper 110 is movable and grips the leading end of the lamination sheet S with the roller 111. In the present embodiment, the sheet gripper 110 and the roller 111 are separate units. However, the sheet gripper 110 may be formed on the outer circumference of the roller 111 as a single unit.

A description is now given of a series of operations performed in the sheet processing apparatus 100, with reference to FIGS. 1 to 17.

FIGS. 3 to 17 are schematic diagrams illustrating a series of sheet separation performed by the sheet separation device 1.

The series of operations performed in the sheet processing apparatus 100 indicates the operations from separating the lamination sheet S to inserting the inner sheet P into the lamination sheet S. In FIGS. 3 to 17, elements identical to those illustrated in FIG. 1 or 2 are given identical reference numerals, and the descriptions thereof are omitted.

In FIG. 1, the lamination sheet S is loaded on the sheet tray 102 such that a part of the bonded side of the lamination sheet S is located downstream from the pickup roller 105 in the sheet feed direction (sheet conveyance direction). In the sheet processing apparatus 100, the pickup roller 105 picks up the lamination sheet S from the sheet tray 102, and the conveyance roller pair 107 conveys the lamination sheet S toward the entrance roller pair 108.

As illustrated in FIG. 2, the entrance roller pair 108 conveys the lamination sheet S toward the winding roller 109. In the sheet processing apparatus 100, the entrance roller pair 108 conveys the lamination sheet S with the bonded end (the bonding portion "r"), which is one of four sides of the lamination sheet S, as the downstream side in the forward conveyance direction A as indicated by arrow A in FIG. 2.

Figure 3:
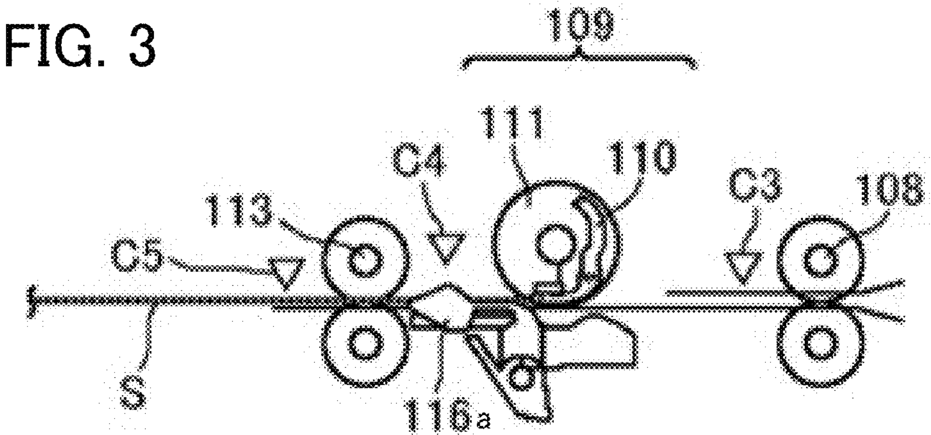
FIG. 3 is a schematic diagram illustrating sheet separation performed by the sheet separation device, subsequent from the sheet separation of FIG. 2.

Subsequently, as illustrated in FIG. 3, the sheet processing apparatus 100 temporarily stops conveyance of the lamination sheet S when the trailing end of the lamination sheet S in the forward conveyance direction has passed the winding roller 109. These operations are performed by conveying the lamination sheet S from the sheet conveyance sensor C3 by a designated amount in response to the timing at which the sheet conveyance sensor C3 detects the leading end of the lamination sheet S.

Figure 4:
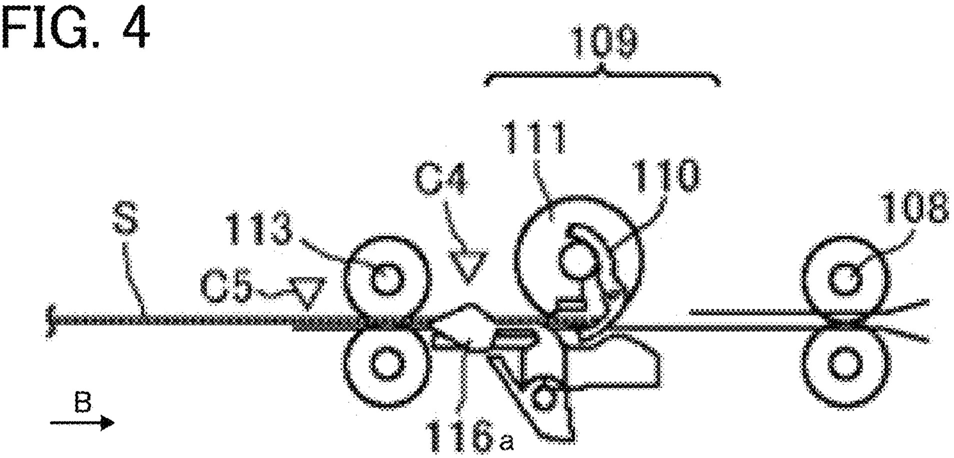
FIG. 4 is a schematic diagram illustrating sheet separation performed by the sheet separation device, subsequent from the sheet separation of FIG. 3.

As illustrated in FIG. 4, the sheet processing apparatus 100 causes the sheet gripper 110 to open and the exit roller pair 113 to rotate in the reverse direction to convey the lamination sheet S in the opposite conveyance direction (i.e., the opposite conveyance direction B) toward an opening portion of the sheet gripper 110.

Figure 5:
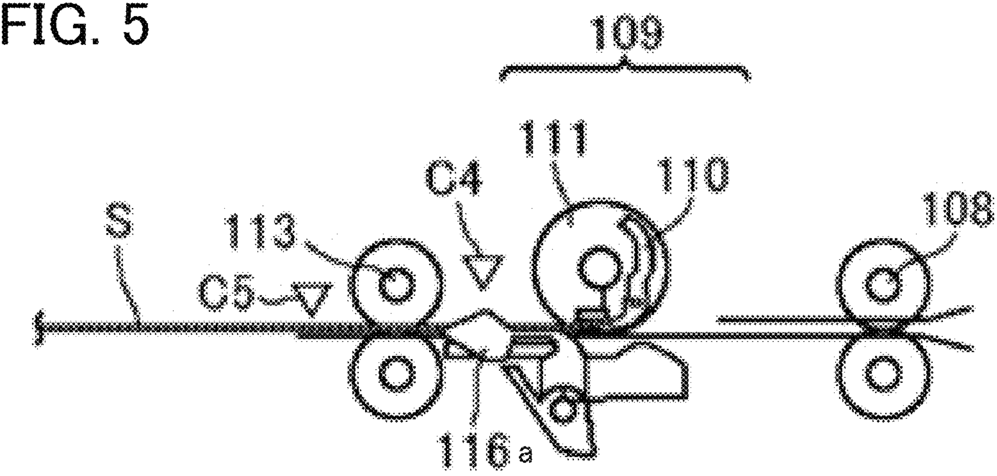
FIG. 5 is a schematic diagram illustrating sheet separation performed by the sheet separation device, subsequent from the sheet separation of FIG. 4.

Subsequently, as illustrated in FIG. 5, the sheet processing apparatus 100 stops conveyance of the lamination sheet S when the trailing end of the lamination sheet S is inserted into the opening portion of the sheet gripper 110, and causes the sheet gripper 110 to close and grip the trailing end of the lamination sheet S. These operations are performed when the lamination sheet S is conveyed by the designated amount.

Figure 6:
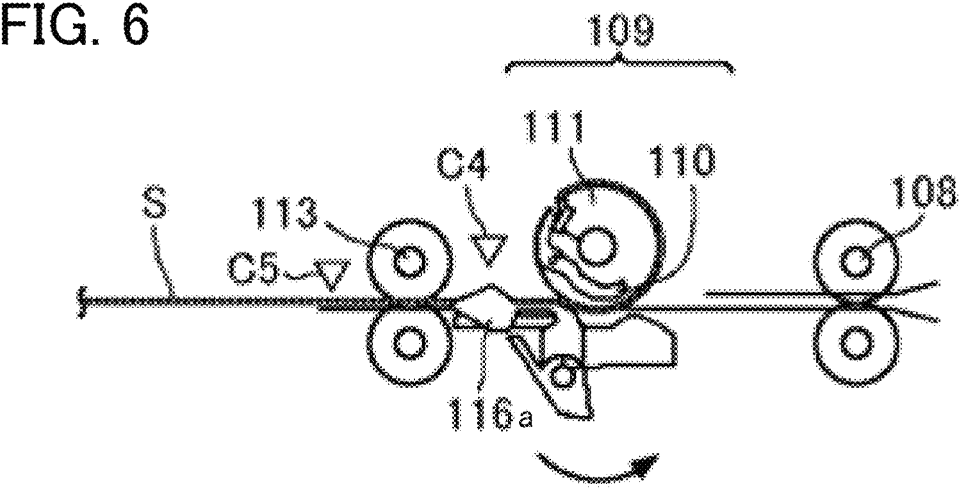
FIG. 6 is a schematic diagram illustrating sheet separation performed by the sheet separation device, subsequent from the sheet separation of FIG. 5.

Then, as illustrated in FIG. 6, the sheet processing apparatus 100 causes the driver to rotate the winding roller 109 in the counterclockwise direction in FIG. 6 to wind the lamination sheet S around the winding roller 109. The lamination sheet S is wound around the winding roller 109 from the side where the two sheets of the lamination sheet S are overlapped but not bonded (the non-bonding portion).

Figure 7:
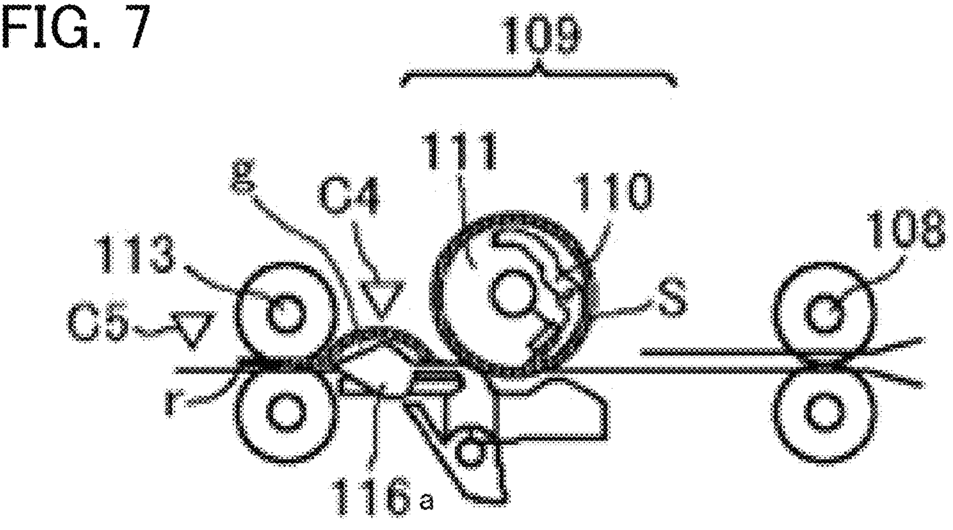
FIG. 7 is a schematic diagram illustrating sheet separation performed by the sheet separation device, subsequent from the sheet separation of FIG. 6.

As illustrated in FIG. 7, when the lamination sheet S is wound around the winding roller 109, a winding circumferential length difference is created between the two sheets in the amount of winding of the lamination sheet S (i.e., two-ply sheet) around the circumference of the winding roller 109. There is a surplus of the sheet on the inner circumferential side to the center of the winding roller 109, which generates a slack toward the bonded end. As a result, a space "g" (slack) is created between the two sheets of the lamination sheet S. As the separation members 116*a* and 116*b* are inserted into the space "g" formed as described above, from opposed sides of the lamination sheet S, the space "g" between the two sheets is reliably maintained. In response to the detection of the leading end of the lamination sheet S with the sheet conveyance sensor C5, the lamination sheet S is conveyed from the sheet conveyance sensor C5 by a designated amount to perform these operations.

A description is now given of the separation members 116*a* and 116*b*.

FIG. 18 is a schematic view of the separation member 116*a* as one of the separation members 116*a* and 116*b* included in the sheet processing apparatus 100.

Figure 19A:
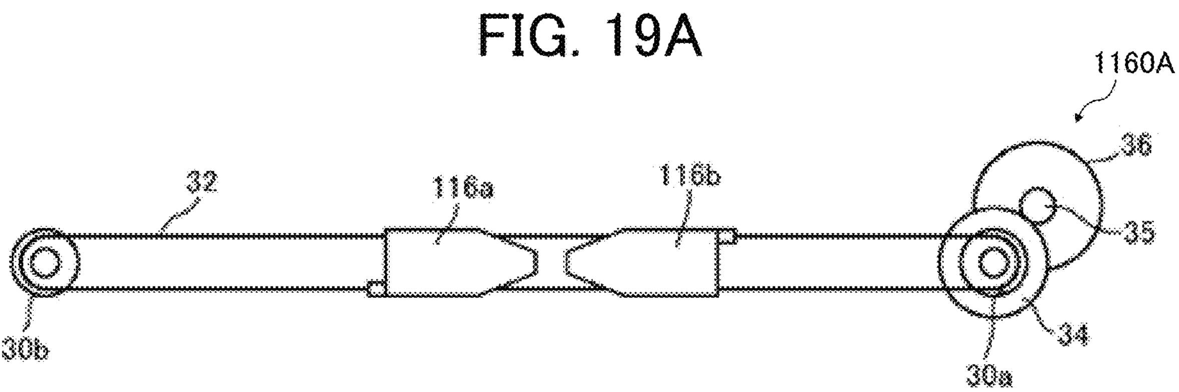
FIGS. 19A and 19B are schematic view of a driving mechanism to move the separation members.
Figure 19B:
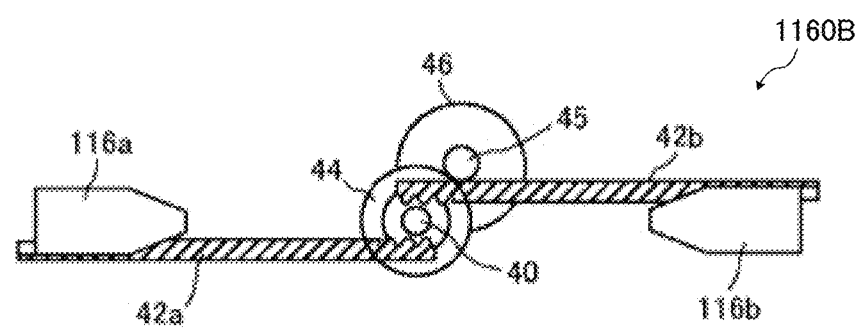

FIGS. 19A and 19B are schematic views, each illustrating an example of a driving mechanism to contact and separate the separation members 116*a* and 116*b* with respect to each other.

Figure 20:
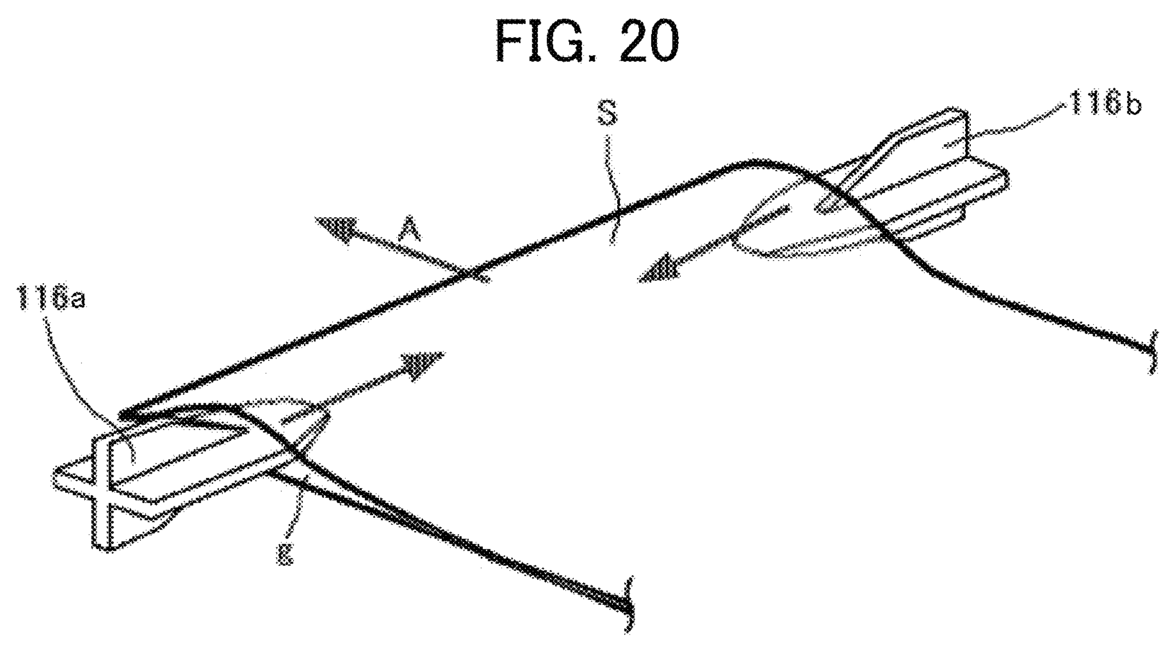
FIG. 20 is a perspective view of the separation members performing an operation.

Further, FIG. 20 is a perspective view of a state in which the separation members 116*a* and 116*b* are inserted into the lamination sheet S.

As illustrated in FIG. 18, when viewed from the upstream side in the sheet conveyance direction, the size in the height (vertical direction) of the separation member 116*a* gradually increases from the center in the width direction to the trailing end (right end in FIG. 18). Further, when viewed from the vertical direction, the size of the separation member 116*a* in the sheet conveyance direction gradually increases from the leading end to the center. When viewed from the width direction of the separation member 116*a*, the separation member 116*a* has a cross shape. The separation member 116*a* further has a branching member that functions as a guide to guide the two sheets separated from the lamination sheet S in different directions due to the above-described cross shape.

Further, in the present embodiment, referring to FIGS. 19A and 19B, the separation members 116*a* and 116*b* are disposed facing each other and moved in the approaching direction and the separating direction, for example, by a belt drive mechanism 1160A as illustrated in FIG. 19A and by a rack and pinion mechanism 1160B illustrated in FIG. 19B. More specifically, the belt drive mechanism 1160A illustrated in FIG. 19A includes a belt 32 stretched between a drive pulley 30*a* and a driven pulley 30*b* and the separation members 116*a* and 116*b* are attached to the belt 32 while facing each other. The separation member 116*a* is attached and connected to the lower part of the belt 32 and the separation member 116*b* is attached and connected to the upper part of the belt 32.

The drive pulley 30*a* is provided with a drive transmission gear 34. The rotational output of a separation member motor 36 is transmitted to the drive transmission gear 34 via a motor output gear 35. In other words, the rotational output of the separation member motor 36 is transmitted to the belt 32.

As a result, as the separation member motor 36 is rotated in the clockwise direction (when viewed from the front of the drawing), the separation members 116*a* and 116*b* are moved toward each other. By contrast, as the separation member motor 36 is rotated in the counterclockwise direction (when viewed from the front of the drawing), the separation members 116*a* and 116*b* are moved away from each other.

The rack and pinion mechanism 1160B illustrated in FIG. 19B includes two racks 42*a* and 42*b* extending in opposite directions from each other. Each of the racks 42*a* and 42*b* meshes with a single pinion 40. The separation member 116*a* that is attached to the rack 42*a* faces the separation member 116*b* that is attached to the rack 42*b*. The pinion 40 is provided with a drive transmission gear 44. The rotational output of a separation member motor 46 is transmitted to the drive transmission gear 44 via a motor output gear 45. The rotational output of the separation member motor 46 is transmitted to the racks 42*a* and 42*b*, respectively.

As a result, as the separation member motor 46 is rotated in the clockwise direction (when viewed from the front of the drawing), the separation members 116*a* and 116*b* are moved toward each other. By contrast, as the separation member motor 46 is rotated in the counterclockwise direction (when viewed from the front of the drawing), the separation members 116*a* and 116*b* are moved away from each other.

As described above, in the present embodiment, each of the separation members 116*a* and 116*b* has the above-mentioned shape and is movable in the width direction of the lamination sheet S. Accordingly, the separation members 116*a* and 116*b* are smoothly inserted into the space “g” created in the lamination sheet S as illustrated in FIG. 20.

Figure 8:
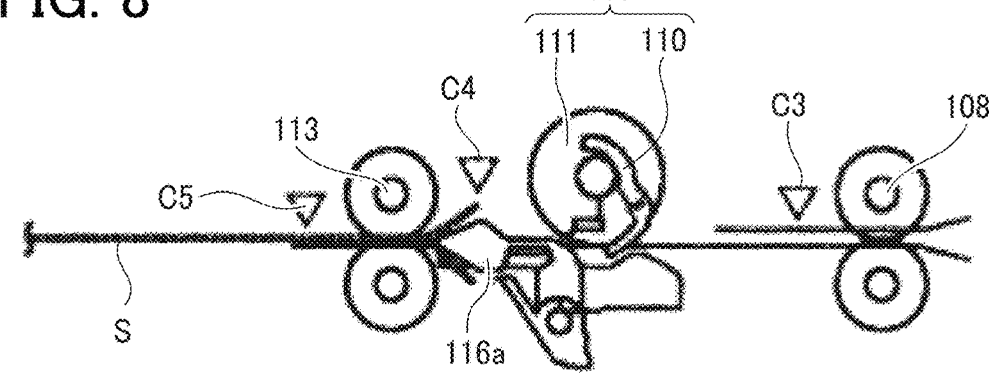
FIG. 8 is a schematic diagram illustrating sheet separation performed by the sheet separation device, subsequent from the sheet separation of FIG. 7.

The description of a series of operations of the sheet processing apparatus 100 is continued below. With the separation members 116*a* and 116*b* inserted in the space “g” created in the lamination sheet S (see FIG. 7), the sheet processing apparatus 100 causes the winding roller 109 to rotate in the clockwise direction and shift the space “g” separating the two sheets of the lamination sheet S to the trailing end of the lamination sheet S in the forward conveyance direction (i.e., the direction indicated by arrow A in FIG. 2), as illustrated in FIG. 8. After the winding roller 109 has been rotated by a designated amount, the sheet processing apparatus 100 causes the sheet gripper 110 to open. As a result, the trailing end of the lamination sheet S is separated into the upper and lower sheets at the trailing end.

In this state, the sheet processing apparatus 100 temporarily stops the conveyance of the lamination sheet S and further moves the separation members 116*a* and 116*b* in the width direction of the lamination sheet S to separate the whole area of the trailing end of the lamination sheet S.

In response to the detection of the leading end of the lamination sheet S with the sheet conveyance sensor C5, the lamination sheet S is conveyed from the sheet conveyance sensor C5 by a designated amount to perform these operations.

Figure 21:
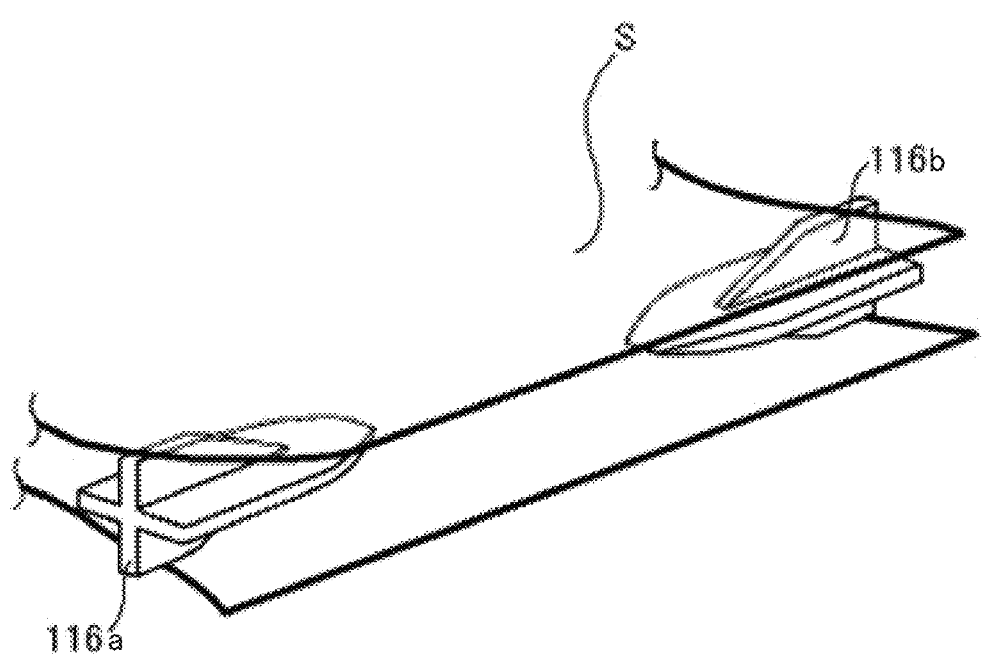
FIG. 21 is a perspective view of the separation members performing an operation subsequent from the operation of FIG. 20.

FIG. 21 is a perspective view of the separation members 116*a* and 116*b* and the lamination sheet S in the state illustrated in FIG. 8.

Since each of the separation members 116*a* and 116*b* further has a branching guide that functions as a guide to guide the two sheets separated from the lamination sheet S in different directions due to the above-described shape (see the cross shape illustrated in FIG. 18), the two sheets separated from the lamination sheet S may be kept in postures to be conveyed to different sheet conveyance passages.

In the present embodiment, the separation members 116*a* and 116*b* function as branching guide plate in the second branched conveyance passage K2, which is described below with reference to the drawings including FIGS. 32A and 32B.

Figure 22:
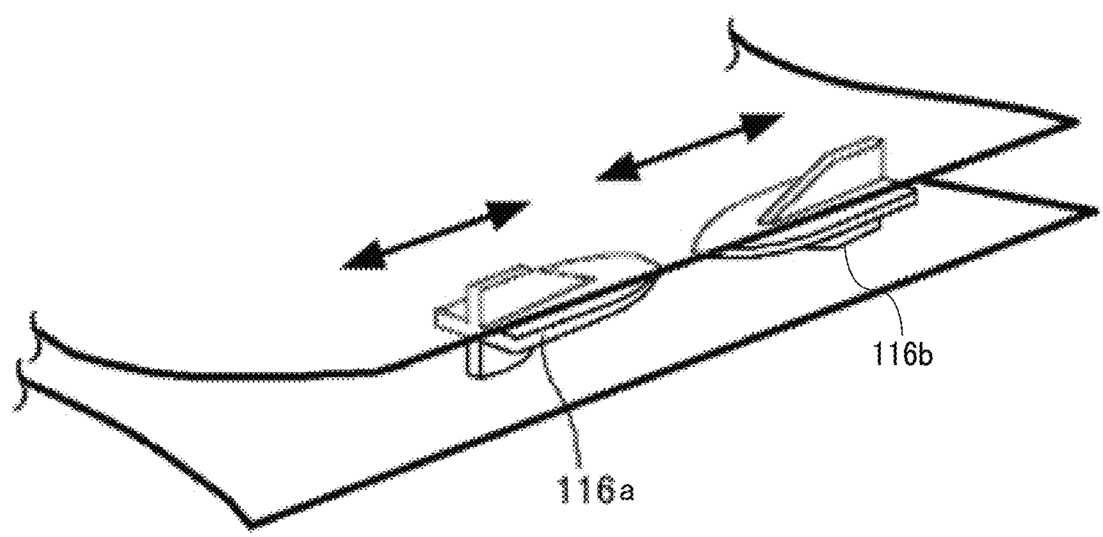
FIG. 22 is a perspective view of the separation members performing an operation subsequent from the operation of FIG. 21.

Further, FIG. 22 is a perspective view of the separation members 116*a* and 116*b* performing an operation subsequent from the operation of FIG. 21.

Since the separation members 116*a* and 116*b* are movable in the width direction of the lamination sheet S (see FIGS. 19A and 19B), the separation members 116*a* and 116*b* are positioned suitably to support the postures of the two sheets of the lamination sheet S as illustrated in FIG. 22. Due to such a configuration, even when the size of the lamination sheet S and the rigidity (or retentivity corresponding to the propensity to retain a particular shape once applied, such as curvature of paper) of the lamination sheet S change, the two sheets separated from the lamination sheet S are guided in desired branching directions. This configuration eliminates the need for a branching member to branch the lamination sheet S over the whole area in the width direction of the sheet conveyance passage and a driver to drive the branching member, thereby reducing the cost when compared with the configuration of a typical sheet processing device.

Figure 9:
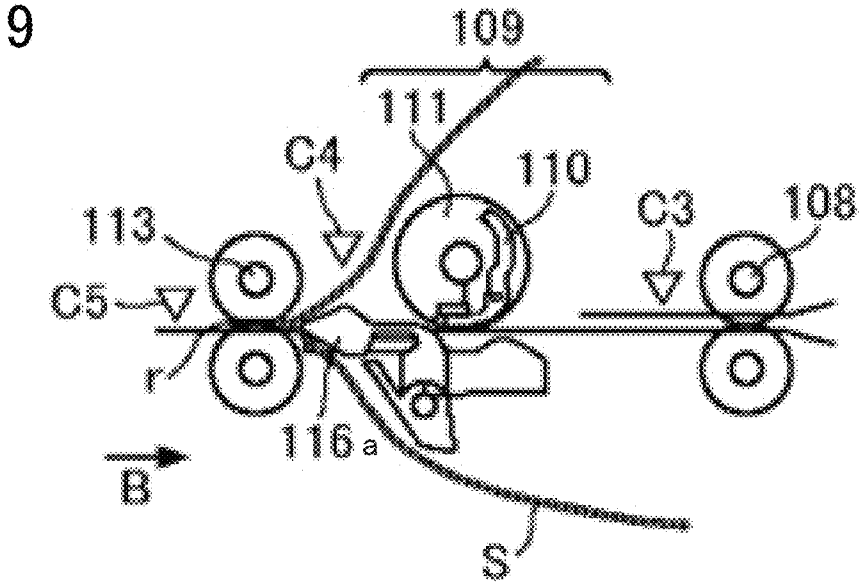
FIG. 9 is a schematic diagram illustrating sheet separation performed by the sheet separation device, subsequent from the sheet separation of FIG. 8.

Subsequently, as illustrated in FIG. 9, after the separation members 116*a* and 116*b* have separated the whole area of the trailing end of the lamination sheet S, the sheet processing apparatus 100 causes the driver to rotate the exit roller pair 113 in the counterclockwise direction in FIG. 9 to convey the lamination sheet S in the opposite conveyance direction (i.e., the direction indicated by arrow B in FIG. 9). In other words, the separation members 116*a* and 116*b* guide the two sheets separated from the lamination sheet S vertically, in other words, in the upper and lower directions (to the branched conveyance passages K1 and K2), respectively, and thus the two sheets are fully separated.

The configuration and operation of each of the branched conveyance passages K1 and K2 according to the present embodiment are described in further detail below, with reference to FIGS. 32A to 34B.

The sheet processing apparatus 100 temporarily stops the conveyance of the lamination sheet S, so that a bonding portion “r” of the lamination sheet S is gripped (nipped) by the exit roller pair 113. Accordingly, one end of the lamination sheet S is bonded as the bonded side, in other words, the bonding portion “r”, of the lamination sheet S and the other end of the lamination sheet S is opened largely.

In response to the detection of the leading end of the lamination sheet S with the sheet conveyance sensor C5, the lamination sheet S is conveyed from the sheet conveyance sensor C5 by a designated amount to perform these operations.

A description is now given of the operation of inserting the inner sheet P into the lamination sheet S between the separated two sheets, which are the first sheet S1 and the second sheet S2.

The sheet processing apparatus 100 according to the present embodiment can insert one inner sheet P to multiple inner sheets P into a lamination sheet S depending on the size of the lamination sheet S (i.e., the length of the lamination sheet S in the sheet conveyance direction) and the size of the inner sheet P (i.e., the length of the inner sheet P in the sheet conveyance direction). Firstly, a description is given of a single sheet insertion mode to insert a single inner sheet P into a lamination sheet S, with reference to FIGS. 10 to 12. Then, a description is given of a multiple sheet insertion mode to insert multiple inner sheets P into a lamination sheet S along the sheet conveyance direction, with reference to FIGS. 13 to 16.

Single Sheet Insertion Mode

Figure 10:
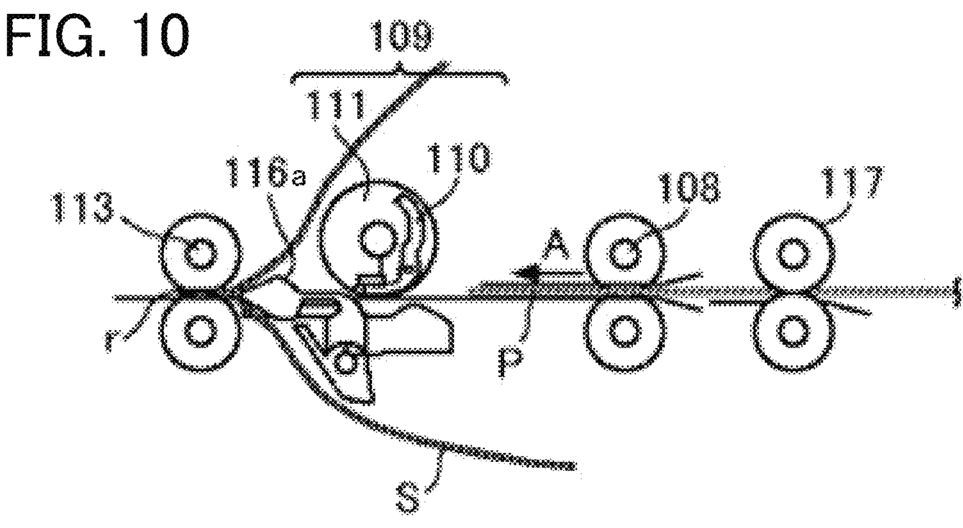
FIG. 10 is a schematic diagram illustrating sheet separation performed by the sheet separation device, subsequent from the sheet separation of FIG. 9.

FIG. 10 is a schematic diagram illustrating sheet separation performed by the sheet separation device 1 of the sheet processing apparatus 100, subsequent from the sheet separation of FIG. 9.

Figure 11:
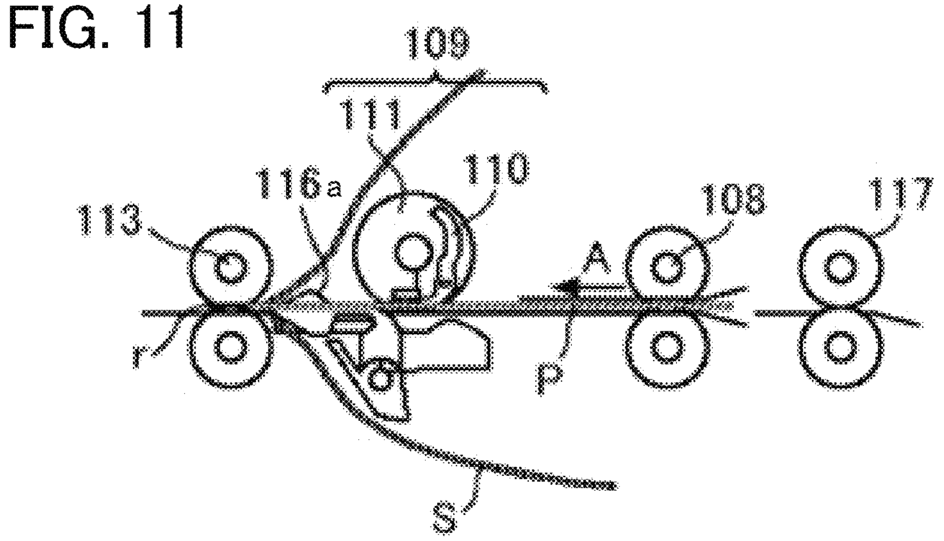
FIG. 11 is a schematic diagram illustrating sheet separation performed by the sheet separation device, subsequent from the sheet separation of FIG. 10.

FIG. 11 is a schematic diagram illustrating sheet separation performed by the sheet separation device 1 of the sheet processing apparatus 100, subsequent from the sheet separation of FIG. 10.

Figure 12:
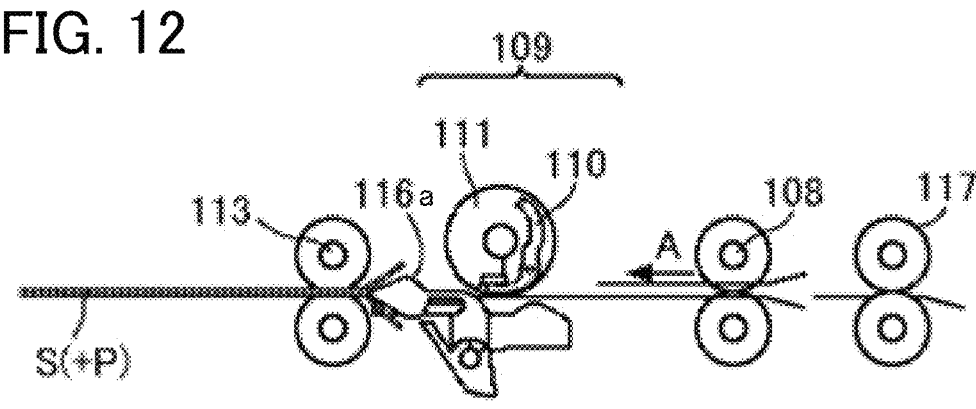
FIG. 12 is a schematic diagram illustrating sheet separation performed by the sheet separation device, subsequent from the sheet separation of FIG. 11.

FIG. 12 is a schematic diagram illustrating sheet separation performed by the sheet separation device 1 of the sheet processing apparatus 100, subsequent from the sheet separation of FIG. 11.

As illustrated in FIG. 10, the sheet separation device 1 of the sheet processing apparatus 100 causes the entrance roller pair 108 to rotate to convey the inner sheet P conveyed from the sheet tray 103 (see FIG. 1) toward the exit roller pair 113 in the forward conveyance direction (i.e., the direction indicated by arrow A in FIG. 10).

Subsequently, as illustrated in FIG. 11, the sheet separation device 1 of the sheet processing apparatus 100 causes the exit roller pair 113 to rotate so that the lamination sheet S and the inner sheet P meet to insert the inner sheet P into the lamination sheet S from the open portion (on the other end) of the lamination sheet S.

Then, as illustrated in FIG. 12, the exit roller pair 113 of the sheet separation device 1 of the sheet processing apparatus 100 conveys the lamination sheet S in which the inner sheet P is inserted, in the forward conveyance direction (i.e., the direction indicated by arrow A in FIG. 12). Thus, the two sheets of the lamination sheet S are overlapped one on another again so as to close the open portion of the lamination sheet S. Then, the lamination sheet S with the inner sheet P being inserted is ejected by the exit roller pair 113 or the ejection roller pair 121 (see FIG. 24) disposed downstream from the exit roller pair 113 and is placed (stacked) on the sheet ejection tray 104 (see FIG. 1).

Multiple Sheet Insertion Mode

Then, a description is given of the multiple sheet insertion mode.

FIG. 13 is a schematic diagram illustrating sheet separation performed by the sheet separation device, subsequent from the sheet separation of FIG. 12.

FIG. 14 is a schematic diagram illustrating sheet separation performed by the sheet separation device, subsequent from the sheet separation of FIG. 13.

FIG. 15 is a schematic diagram illustrating sheet separation performed by the sheet separation device, subsequent from the sheet separation of FIG. 14.

FIG. 16 is a schematic diagram illustrating sheet separation performed by the sheet separation device, subsequent from the sheet separation of FIG. 15.

FIG. 17 is a schematic diagram illustrating sheet separation performed by the sheet separation device, subsequent from the sheet separation of FIG. 16.

In the multiple sheet insertion mode, multiple inner sheets P (two sheets in the present embodiment) are insertable into a single lamination sheet S in the sheet conveyance direction.

Then, as illustrated in FIG. 13, the sheet separation device 1 of the sheet processing apparatus 100 causes the entrance roller pair 108 to rotate to convey a first inner sheet P (referred to as a first inner sheet P1) conveyed from the sheet tray 103 (see FIG. 1) toward the exit roller pair 113 in the forward conveyance direction (i.e., the direction indicated by arrow A in FIG. 2).

Subsequently, as illustrated in FIG. 14, the sheet separation device 1 of the sheet processing apparatus 100 causes the exit roller pair 113 to rotate so that the lamination sheet S and the first inner sheet P1 meet. By so doing, the first inner sheet P1 is inserted into the opening of the lamination sheet S. At this time, the sheet processing apparatus 100 conveys a second inner sheet P (hereinafter, referred to as a second inner sheet P2) conveyed from the sheet tray 103 (see FIG. 1) toward the exit roller pair 113 in the forward conveyance direction (i.e., the direction indicated by arrow A in FIG. 2).

Subsequently, as illustrated in FIG. 15, the sheet separation device 1 of the sheet processing apparatus 100 causes the entrance roller pair 108 to rotate so that the lamination sheet S and the second inner sheet P2 meet. By so doing, the second inner sheet P2 is inserted into the opening of the lamination sheet S.

As illustrated in FIG. 16, the sheet separation device 1 of the sheet processing apparatus 100 causes the exit roller pair 113 to convey the lamination sheet S, with the first inner sheet P1 and the second inner sheet P2 being inserted, in the forward conveyance direction (i.e., the direction indicated by arrow A in FIG. 2). By so doing, the two sheets are overlaid one on another again to close the opening of the lamination sheet S.

Even if there are three or more inner sheets P, the three or more inner sheets P can be inserted in the lamination sheet S by repeating the above-described operations.

As an alternative example, in a case where a sheet processing device 100 includes a sheet lamination device 50 (see multiple thermal fixing roller pairs 120 in FIG. 24) that can heat and press the lamination sheet S, a branching member 118 may change (switch) the sheet conveyance passage of the lamination sheet S to convey the lamination sheet S to the sheet lamination device 50, as illustrated in FIG. 17. Not only in the multiple sheet insertion mode but also in the single sheet insertion mode, the sheet conveyance passage may be changed (switched) with the branching member 118.

As described above, the sheet processing apparatus 100 according to the present embodiment can control the driver and other parts to perform the sheet inserting operation of inner sheets P to be inserted into a lamination sheet S.

A description is now given of a configuration in which the sheet processing apparatus 100 acquires the size of the lamination sheet S (i.e., the length in the sheet conveyance direction of the lamination sheet S), the size of the inner sheet P (i.e., the length in the sheet conveyance direction of the inner sheet P), and the number of the inner sheets P to be inserted into the lamination sheet S.

As illustrated in FIG. 1, the sheet processing apparatus 100 according to the present embodiment includes the sheet size sensor C6 functioning as a sheet size detector and the sheet size sensor C7 functioning as a medium size detector. Based on the detection results of the sheet size sensors C6 and C7, the sheet processing apparatus 100 determines whether the length of the inner sheet P in the sheet conveyance direction is equal to or smaller than the threshold value. When the length of the inner sheet P in the sheet conveyance direction is equal to or smaller than the threshold value, the sheet processing apparatus 100 automatically switches to the multiple sheet insertion mode to perform the sheet inserting operation. On the other hand, when the length of the inner sheet P in the sheet conveyance direction is greater than the threshold value, the sheet processing apparatus 100 automatically switches to the single sheet insertion mode to perform the sheet inserting operation.

In particular, when the length of the inner sheet P in the sheet conveyance direction is equal to or smaller than half the length of the lamination sheet S in the sheet conveyance direction, the sheet processing apparatus 100 may automatically switch to the multiple sheet insertion mode to perform the sheet inserting operation. Further, in the multiple sheet insertion mode, the sheet processing apparatus 100 determines the number of inner sheets P to be inserted into the lamination sheet S from the quotient of the size of the lamination sheet S divided by the size of the inner sheet P.

Instead of or in addition to the detection results of the sheet size sensors C6 and C7, the sheet processing apparatus 100 may use the detection results of the sheet conveyance sensors C1 and C2.

As described above, the sheet processing apparatus 100 according to the present embodiment can automatically control the sheet inserting operation in accordance with the size of the lamination sheet S and the size of the inner sheet P.

Additionally, as illustrated in FIG. 1, the sheet processing apparatus 100 according to the present embodiment can separately stack the lamination sheets S and the inner sheets P on separate trays to be conveyed separately. Accordingly, there is no need to stack the lamination sheets S and the inner sheets P in a predetermined order, and this configuration can enhance the convenience. In the present embodiment, the lamination sheets S are stacked on the sheet tray 102 and the inner sheets P are stacked on the sheet tray 103. However, the tray on which the lamination sheets S are stacked and the tray on which the inner sheets P are stacked are not limited to the above-described trays. For example, the inner sheets P may be stacked on the sheet tray 102 and the lamination sheets S may be stacked on the sheet tray 103.

Configuration of Branched Conveyance Passages K1 and K2

Figures 23A, 23B, 23C:
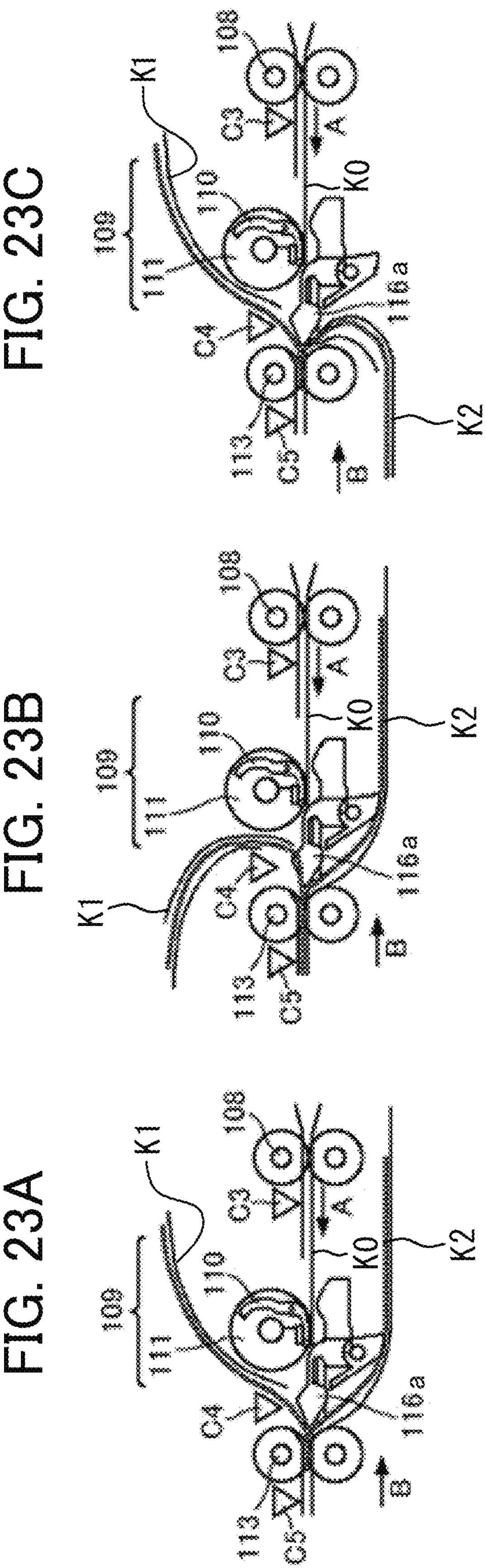
FIGS. 23A, 23B, and 23C are diagrams illustrating various types of two branched conveyance passages.

FIGS. 23A, 23B, and 23C are diagrams illustrating various types of two branched conveyance passages.

FIGS. 23A, 23B, and 23C depict various forms of the first branched conveyance passage K1 and the second branched conveyance passage K2 (two conveyance passages branched from the main conveyance passage K0 to the upper and lower sides) for the separated two sheets of the lamination sheet S. Specifically, FIG. 23A illustrates a case where the separated two sheets are guided from the bonding portion "r" of the lamination sheet S in the direction opposite to the sheet conveyance direction (i.e., the direction indicated by arrow B in FIG. 23A) to the first branched conveyance passage K1 and the second branched conveyance passage K2, as illustrated in FIG. 9. Alternatively, as illustrated in FIG. 23B, the upper sheet of the separated two sheets of the lamination sheet S may be guided from the bonding portion "r" to the first branched conveyance passage K1 extending in the sheet conveyance direction (i.e., the direction indicated by arrow A in FIG. 23B) and the lower sheet of the separated two sheets of the lamination sheet S may be guided from the bonding portion "r" to the second branched conveyance passage K2 extending in the direction opposite to the sheet conveyance direction. Further, as illustrated in FIG. 23C, the upper sheet of the separated two sheets of the lamination sheet S may be guided from the bonding portion r to the first branched conveyance passage K1 in the direction opposite to the sheet conveyance direction and the lower sheet of the separated two sheets of the lamination sheet S may be guided from the bonding portion "r" to the second branched conveyance passage K2 in the sheet conveyance direction. As illustrated in FIG. 9A, the two sheets separated from each other from the lamination sheet S are branched by the separation members 116*a* and 116*b* and then guided in the direction opposite to the sheet conveyance direction. However, the two sheets separated from each other from the lamination sheet S may be branched by the separation members 116*a* and 116*b* and then guided in the sheet conveyance direction.

A description is then given of a sheet laminator including the sheet processing device, and an image forming system including the sheet laminator, according to an embodiment of the present disclosure.

Figure 24:
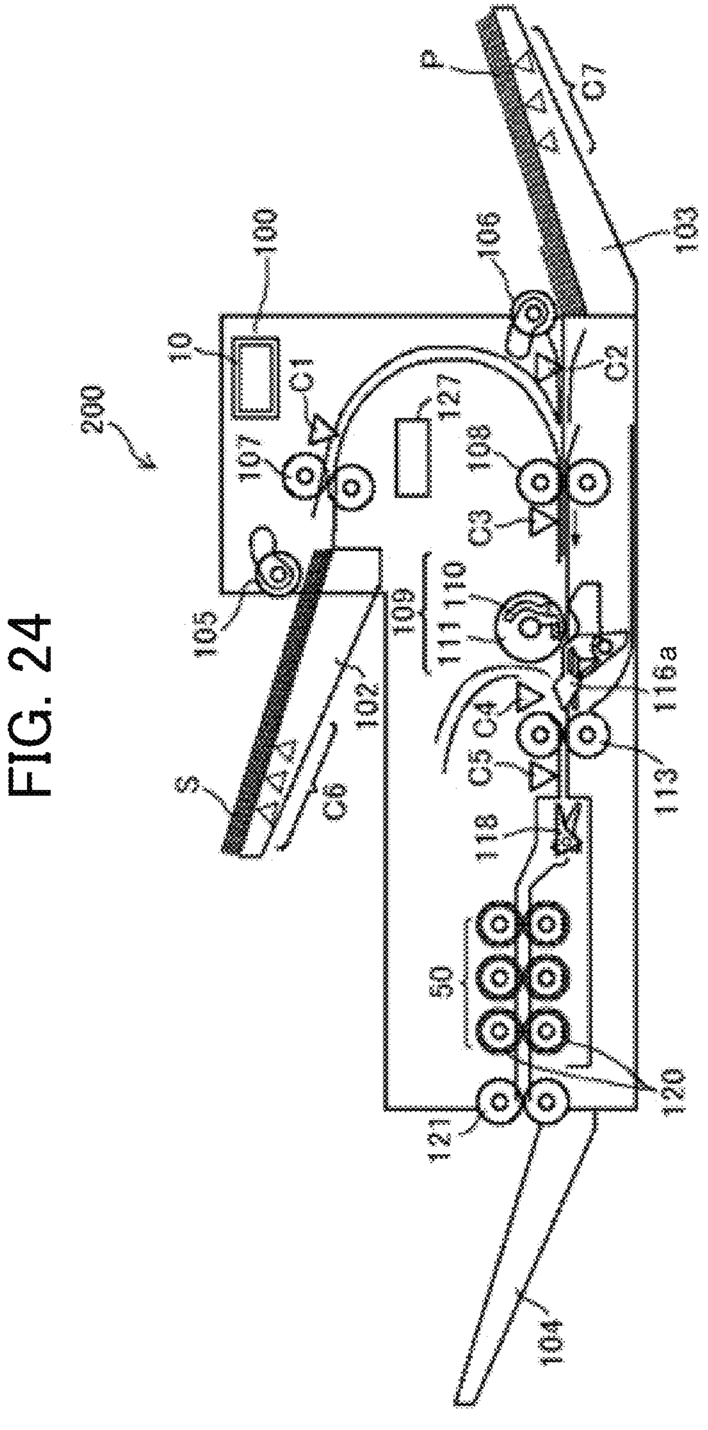
FIG. 24 is a diagram illustrating an overall configuration of a sheet processing apparatus (sheet laminator) including a sheet lamination device.

FIG. 24 is a diagram illustrating an overall configuration of a sheet laminator as an example of a sheet processing apparatus and including a sheet lamination device 50.

As illustrated in FIG. 24, the sheet laminator 200 includes the sheet processing apparatus 100 described above, the branching member 118, the sheet lamination device 50, and an ejection roller pair 121. The branching member 118 changes (switches) the sheet conveyance passage of the lamination sheet S. The sheet lamination device 50 includes the multiple thermal fixing roller pairs 120 and is capable of heating and pressing the lamination sheet S. The ejection roller pair 121 is disposed downstream from the sheet lamination device 50 (the thermal fixing roller pairs 120) in the sheet conveyance direction.

Figure 27:
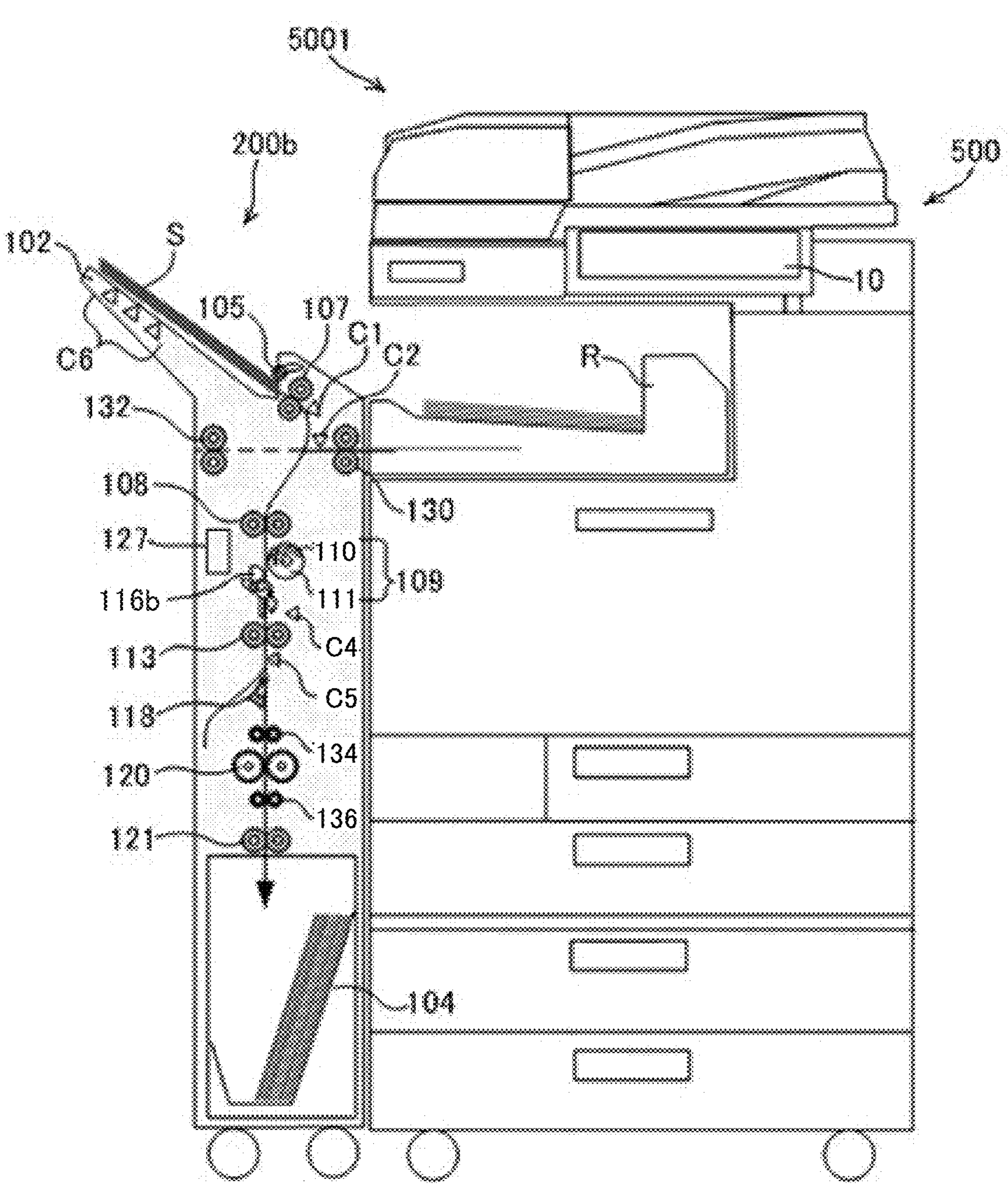
FIG. 27 is a diagram illustrating an image forming system according to yet another embodiment of the present disclosure.
Figure 28:
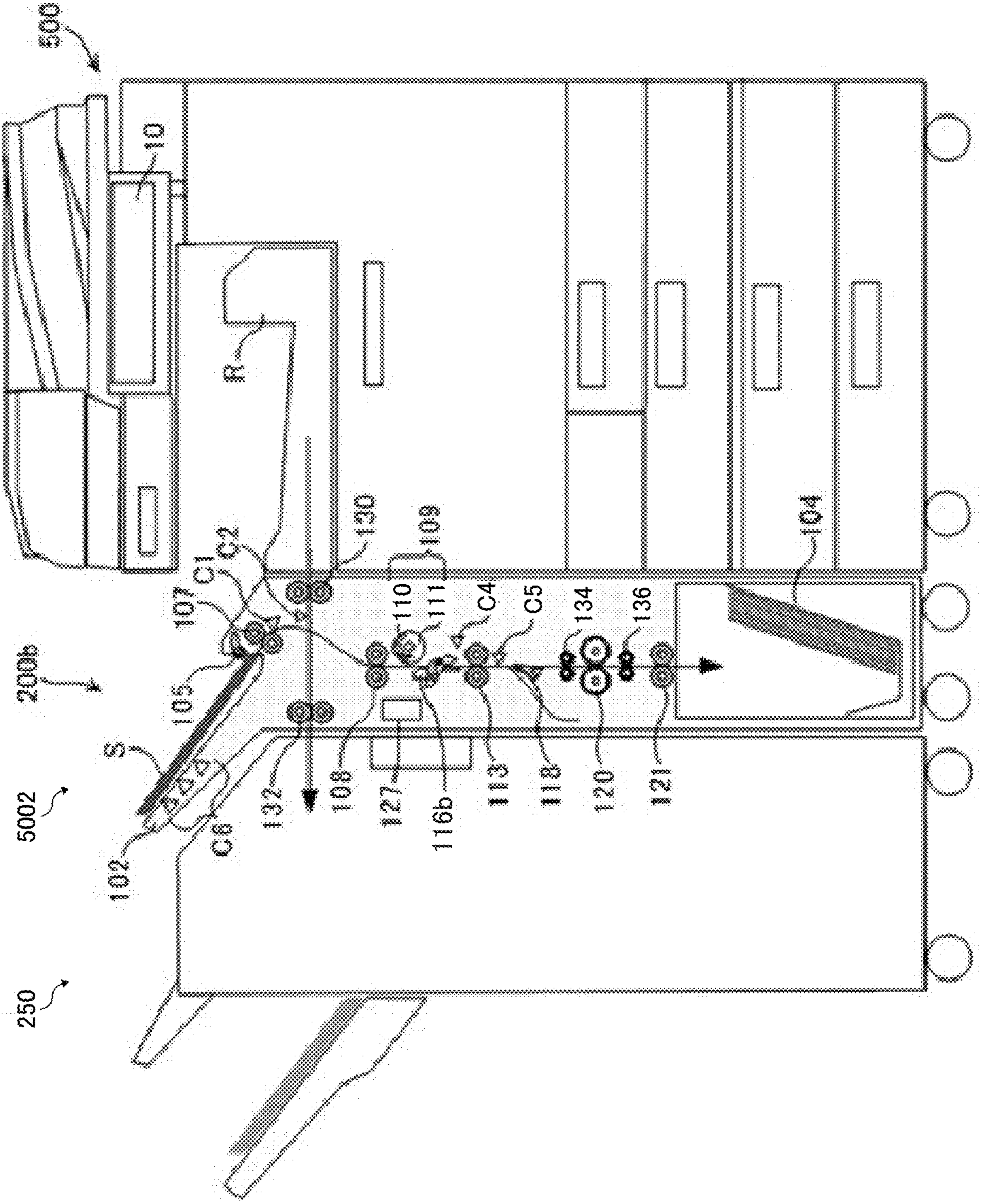
FIG. 28 is a diagram illustrating an image forming system according to yet another embodiment of the present disclosure.

The sheet laminator 200 may have a configuration that includes a single thermal fixing roller pair 120, such as a sheet laminator 200*b* illustrated in FIGS. 27 and 28.

The sheet laminator 200 performs a series of operations, in this order, of feeding the lamination sheet S, separating the lamination sheet S, inserting the inner sheet P into the lamination sheet S, and laminating the lamination sheet S with the inner sheet P being inserted, by application of heat and pressure, on a stand-alone basis. This series of operations is carried out automatically without any aid of a user. For this reason, the sheet laminator 200 can enhance and provide the convenience better than a known sheet laminator employing a known technique.

Figure 25:
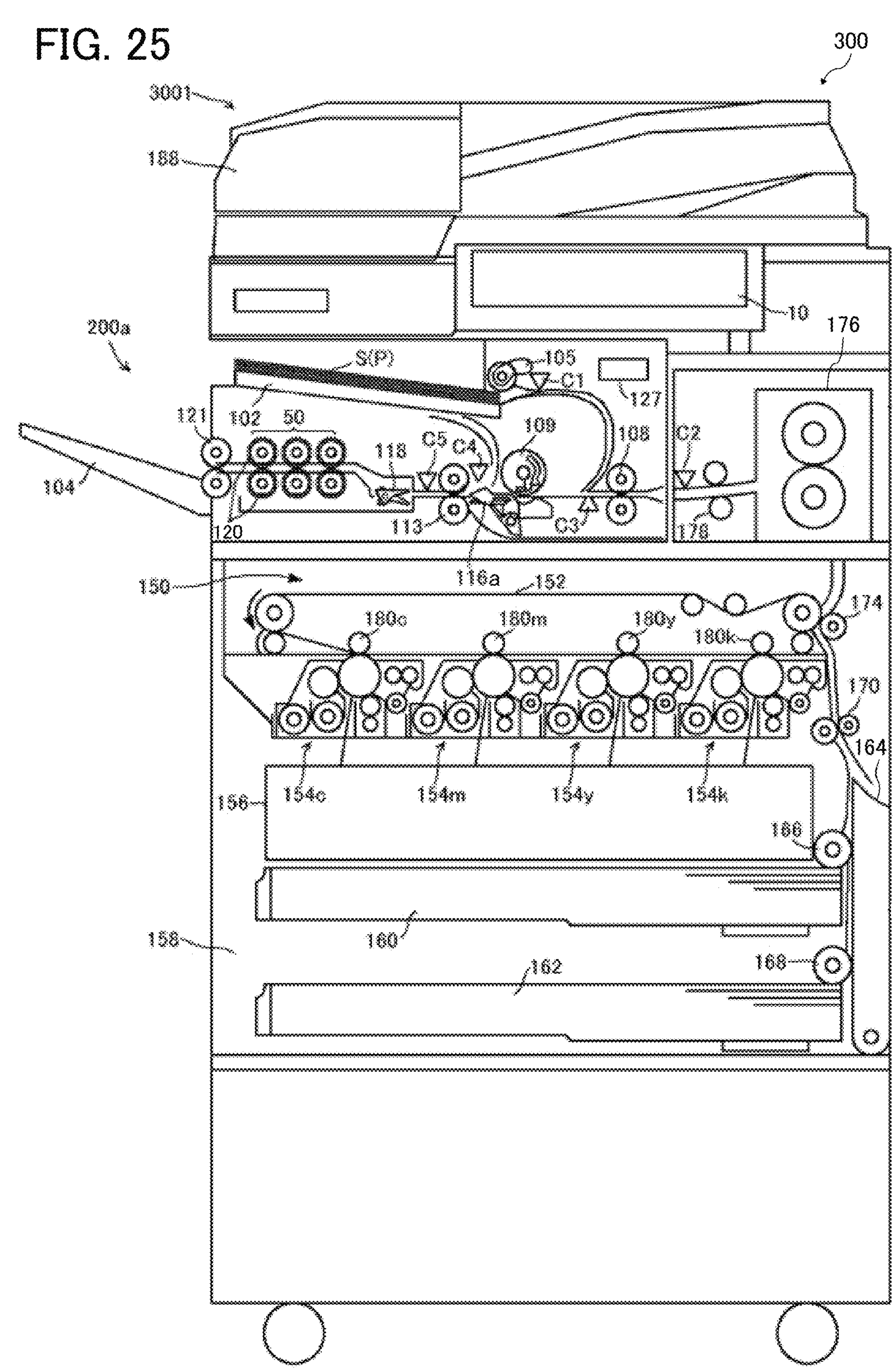
FIG. 25 is a diagram illustrating an overall configuration of an image forming system including the sheet processing apparatus (sheet laminator) illustrated in FIG. 24.

FIG. 25 is a diagram illustrating an overall configuration of an image forming system including the sheet processing apparatus (sheet laminator) illustrated in FIG. 24.

An image forming system 3001 includes a sheet laminator 200*a* in an in-body sheet discharging section of an image forming apparatus 300. The sheet laminator 200*a* functions as a device that performs sheet lamination.

The sheet laminator 200*a* includes the sheet tray 102 on which the lamination sheets S or the inner sheets P are stacked. The sheet laminator 200*a* can receive the lamination sheets S, the inner sheets P, or both from the image forming apparatus 300. Accordingly, the image forming apparatus 300 (e.g., a printer and a copier) can form an image on the lamination sheet S or the inner sheet P by the in-line connection.

A detailed description is given of the configuration of the image forming apparatus 300.

As illustrated in FIG. 25, the image forming apparatus 300 includes an intermediate transfer device 150. The intermediate transfer device 150 includes an intermediate transfer belt 152 having an endless loop and being entrained around a plurality of rollers and stretched substantially horizontally. The intermediate transfer belt 152 rotates in the counterclockwise direction in FIG. 33.

The image forming apparatus 300 further includes image forming units 154*c*, 154*m*, 154*y*, and 154*k* for cyan (C), magenta (M), yellow (Y), and black (K), respectively. The image forming units 154*c*, 154*m*, 154*y*, and 154*k* are disposed below the intermediate transfer device 150 in the housing of the image forming apparatus 300. The image forming units 154*c*, 154*m*, 154*y*, and 154*k* are aligned in a quadruple tandem manner along an extended direction of the intermediate transfer belt 152. Each of the image forming units 154*c*, 154*m*, 154*y*, and 154*k* includes a drum-shaped image bearer that rotates in the clockwise direction in FIG. 25. Various image forming components, for example, a charging unit, a developing unit, a transfer unit, and a cleaning unit, are disposed around each of the image forming units 154*c*, 154*m*, 154*y*, and 154*k*. An exposure device 156 is disposed below the image forming units 154*c*, 154*m*, 154*y*, and 154*k* included in the image forming apparatus 300.

A sheet feeder 158 is disposed below the exposure device 156 in the image forming apparatus 300. The sheet feeder 158 includes a first sheet tray 160 that stores lamination sheets S and a second sheet tray 162 that stores inner sheets P. The first sheet tray 160 is an example of a third sheet stacker on which two-ply sheets are stacked, and the second sheet tray 162 is an example of a fourth sheet stacker on which sheet media are stacked.

A first sheet feed roller 166 is disposed at a position upper right of the first sheet tray 160 and feeds the lamination sheets S from the first sheet tray 160 one by one to a sheet conveyance passage 164. A second sheet feed roller 168 is disposed at a position upper right of the second sheet tray 162 and feeds the inner sheets P from the second sheet tray 162 one by one to the sheet conveyance passage 164.

The sheet conveyance passage 164 extends upwardly from the lower side to the upper side on the right side in the image forming apparatus 300 and communicates with the sheet laminator 200*a* in the image forming apparatus 300. The sheet conveyance passage 164 is provided with, e.g., a conveyance roller pair 170, a secondary transfer device 174 in contact with the intermediate transfer belt 152, a fixing device 176, and a first sheet ejection device 178 including the ejection roller pair, serially.

The first sheet feed roller 166, the conveyance roller pair 170, and the sheet conveyance passage 164 are examples of a third feeder to feed a two-ply sheet (the lamination sheet S) from the first sheet tray 160 functioning as a third sheet stacker. The second sheet feed roller 168, the conveyance roller pair 170, and the sheet conveyance passage 164 are examples of a fourth feeder to feed a sheet medium (the inner sheet P) from the second sheet tray 162 functioning as a fourth sheet stacker. Further, the intermediate transfer device 150 and the fixing device 176 function as a part of the image forming device that forms an image on a sheet medium (i.e., the inner sheet P).

A description is now given of operations of the image forming apparatus 300 according to the present embodiment, to form an image on a sheet medium (i.e., the inner sheet P) and then perform a sheet laminating operation on the lamination sheet S. To perform an image on the sheet medium (i.e., the inner sheet P), first, an image reading device 188 reads the image on an original document, and the exposure device 156 then performs writing of the image on the original document. The image forming units 154*c*, 154*m*, 154*y*, and 154*k* form respective toner images of cyan (C), magenta (M), yellow (Y), and black (K), respectively, on the respective image bearers. Then, primary transfer devices 180*c*, 180*m*, 180*y*, and 180*k* sequentially transfer the respective toner images onto the intermediate transfer belt 152, thereby forming a color image on the intermediate transfer belt 152.

By contrast, the image forming apparatus 300 rotates the second sheet feed roller 168 to feed and convey the two-ply inner sheet P to the sheet conveyance passage 164. The inner sheet P is conveyed by the conveyance roller pair 170 through the sheet conveyance passage 164 and is sent to the secondary transfer device 174 in synchrony with movement of the color image on the intermediate transfer belt 152. Then, the secondary transfer device 174 transfers the color image formed on the intermediate transfer belt 152 as described above, onto the inner sheet P.

After the color image has been transferred onto the inner sheet P, the fixing device 176 fixes the color image to the inner sheet P, and the first sheet ejection device 178 ejects to convey the inner sheet P to the sheet laminator 200*a*.

The sheet laminator 200*a* rotates the pickup roller 105 to pick up the lamination sheet S from the sheet tray 102 on which the lamination sheet S is stacked and conveys the lamination sheet S to the sheet separation device 1 (including the winding roller 109 and the separation members 116*a* and 116*b*). The sheet separation device 1 separates a lamination sheet S into two sheets and conveys an inner sheet P conveyed from the image forming apparatus 300 by the entrance roller pair 108. By so doing, the inner sheet P is inserted between the separated two sheets of the lamination sheet S. Then, the lamination sheet S with the inner sheet P being inserted is conveyed by the exit roller pair 113 to the sheet lamination device 50 (thermal fixer). Then, the sheet laminating operation of the sheet lamination device 50 applies heat and pressure to the lamination sheet S in which the inner sheet P is inserted, in other words, the multiple thermal fixing roller pairs 120 of the sheet lamination device 50 performs a sheet laminating operation on the lamination sheet S with the inner sheet P being inserted.

As described above, the lamination sheet S and the inner sheet P on which an image is formed are conveyed to the sheet laminator 200*a* to receive the sheet laminating operation performed by the sheet laminator 200*a*.

According to the above-described configuration of the image forming system 3001 according to the present embodiment, the lamination sheet S stacked on the first sheet tray 160 of the image forming apparatus 300 is conveyed to the sheet laminator 200*a* via the sheet conveyance passage 164 and separate the lamination sheet S into two sheets in the sheet separation device 1. Then, while the sheet laminator 200*a* performs a sheet separating operation on the lamination sheet S, the image forming apparatus 300 conveys the inner sheet P stacked on the second sheet tray 162 in the sheet conveyance passage 164, the secondary transfer device 174, the fixing device 176, and the first sheet ejection device 178 to form an image on the inner sheet P, and then conveyed the inner sheet P to the sheet laminator 200*a*. Then, the sheet laminator 200*a* may also perform the sheet laminating operation on the lamination sheet S after inserting the inner sheet P on which an image is formed into the lamination sheet S separated into two sheets.

Descriptions are then given of an image forming system including the sheet processing device according to an embodiment of the present disclosure and an image forming apparatus, according to different embodiments of the above-described embodiment.

Figure 26:
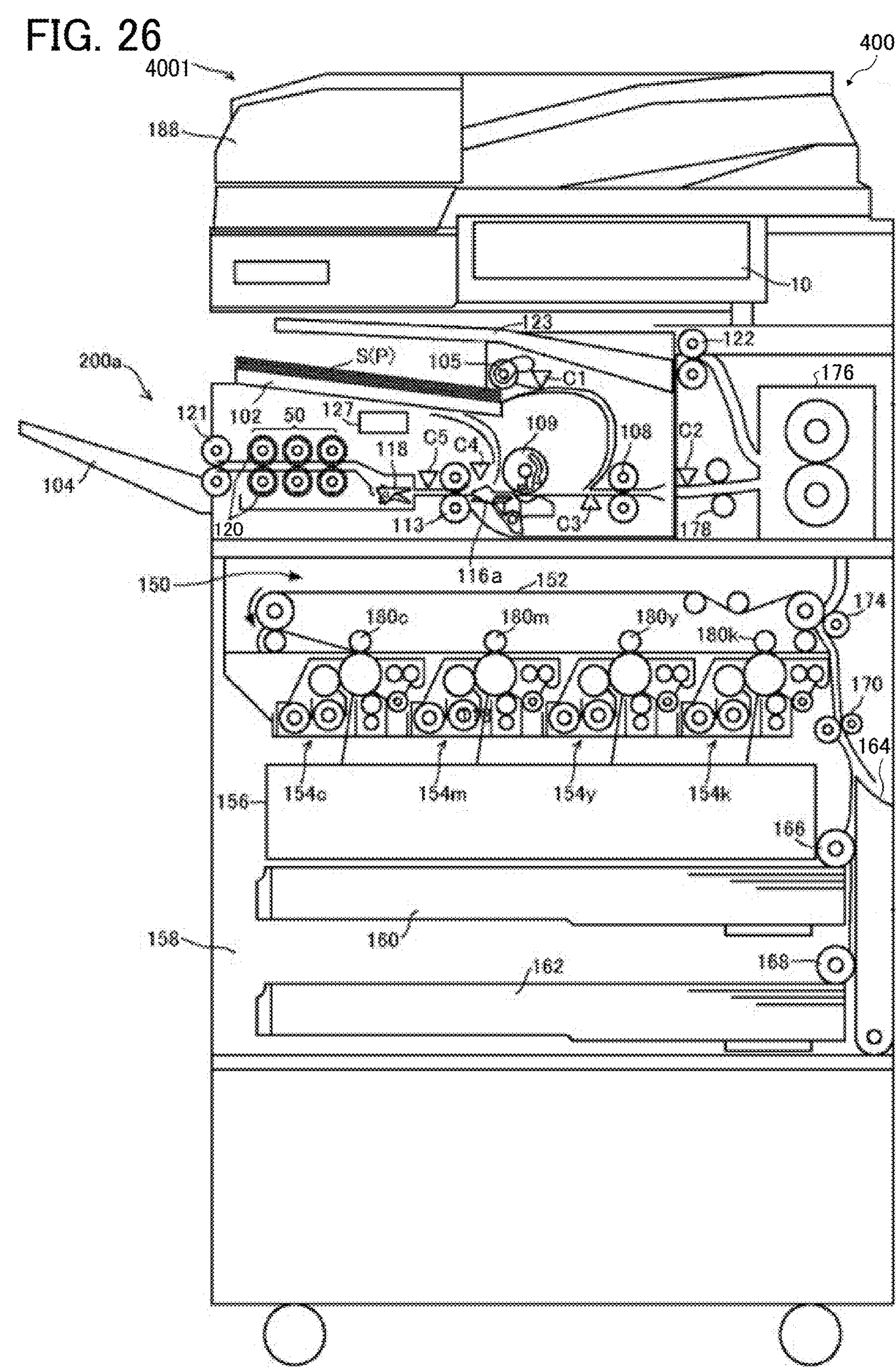
FIG. 26 is a diagram illustrating an image forming system according to another embodiment of the present disclosure.

FIG. 26 is a diagram illustrating an overall configuration of an image forming system including the sheet laminator according to the present disclosure and an image forming apparatus according to an embodiment of the present disclosure, as another embodiment of the present disclosure.

In an image forming system 4001 illustrated in FIG. 26, an image forming apparatus 400 is basically the same as the image forming apparatus 300 illustrated in FIG. 25. However, different from the image forming apparatus 300, the image forming apparatus 400 includes a second sheet ejection device 122 and a sheet ejection tray 123.

When the sheet laminating operation is not performed, the image forming apparatus 400 may form an image on the inner sheet P fed from the second sheet tray 162, and then eject the inner sheet P having the image by the second sheet ejection device 122 including a pair of sheet ejection rollers to the sheet ejection tray 123. Accordingly, when the sheet laminating operation is not performed, the image forming apparatus 400 does not need to decrease the output speed of image formation. For this reason, the image forming apparatus 400 can maintain the image formation productivity.

The image forming apparatus 400 may include the sheet laminator 200*a* detachably attached to the in-body sheet discharging section. In other words, when the sheet laminating operation is not performed, the sheet laminator 200*a* may be detached from the image forming apparatus 400.

In addition, the sheet laminator 200*a* thus detached from the image forming apparatus 400 may include the sheet tray 103 to stack the inner sheets P and the pickup roller 106 to feed the inner sheet P from the sheet tray 103, so that the sheet laminator 200*a* can be used as a single unit such as the sheet laminator 200 illustrated in FIG. 24.

The image forming system 3001 illustrated in FIG. 25 and the image forming system 4001 illustrated in FIG. 26 may include the sheet processing apparatus 100 in an in-body sheet discharging section instead of including the sheet laminator 200*a*. The image forming system 4001 illustrated in FIG. 26 may include the sheet processing apparatus 100 detachably attachable to the image forming system 4001.

Each of the image forming system 3001 illustrated in FIG. 25 and the image forming system 4001 illustrated in FIG. 26 may include a large-capacity sheet ejection device (stacker), a post-processing apparatus such as a binder unit, or both.

In a case where the lamination sheet S that is stacked on the first sheet tray 160 included in the image forming apparatus 300 illustrated in FIG. 25 or the image forming apparatus 400 illustrated in FIG. 26 passes through the fixing device 176, the lamination sheet S is not bonded at the fixing temperature but is bonded by application of heat higher than the fixing temperature.

Although the image forming apparatus 300 illustrated in FIG. 25 and the image forming apparatus 400 illustrated in FIG. 26 employ electrophotography for image formation on the inner sheet P in the description above, the image formation method is not limited to the above-described configuration. For example, inkjet, stencil printing, or other known printing method may be employed to the image forming apparatus 300 and the image forming apparatus 400.

FIG. 27 is a diagram illustrating an image forming system according to yet another embodiment of the present disclosure, including an image forming apparatus and a sheet laminator according to the present disclosure on the outside of the image forming apparatus.

FIG. 28 is a diagram illustrating an image forming system according to yet another embodiment of the present disclosure, including an image forming apparatus and a sheet laminator according to the present disclosure on the outside of the image forming apparatus.

In FIGS. 27 and 28, elements identical to the elements of the image forming system 3001 illustrated in FIG. 25 and the elements of the image forming system 4001 illustrated in FIG. 26 are given identical reference numerals, and the descriptions these elements are omitted.

As illustrated in FIG. 27, an image forming system 5001 is basically same as the image forming system 3001 illustrated in FIG. 25 and the image forming system 4001 illustrated in FIG. 26. However, different from the image forming systems 3001 and 4001, the image forming system 5001 illustrated in FIG. 27 includes a sheet laminator 200*b* on the outside of an image forming apparatus 500. The sheet laminator 200*b* is a vertical-conveyance-type sheet lamination that conveys the lamination sheet S in a vertical direction.

The sheet laminator 200*b* includes the sheet tray 102 on which the lamination sheets S are stacked and has the configuration in which an inner sheet P can be fed from the image forming apparatus 500 via a relay conveyance device R. Due to such a configuration, the image forming system 5001 can automatically perform any image forming operation on an inner sheet P with a copier or a printer (i.e., the image forming apparatus 500), a sheet separating operation on a lamination sheet S, a sheet inserting operation on an inner sheet P having an image into the separated lamination sheet S, and a sheet laminating operation on the lamination sheet S in which the inner sheet P is inserted.

The image forming system 5002 illustrated in FIG. 28 has a configuration in which another post-processing apparatus 250 is disposed further downstream from the vertical-conveyance-type sheet laminator 200*b* in the sheet conveyance direction of the lamination sheet S. This post-processing apparatus 250 includes, for example, a large-capacity sheet ejection device (stacker), a post-processing apparatus such as a binder, or both. According to the request of a user, the job performing the sheet laminating operation and the job not performing the sheet laminating operation can be performed in parallel, which can enhance the working efficiency.

Figure 29:
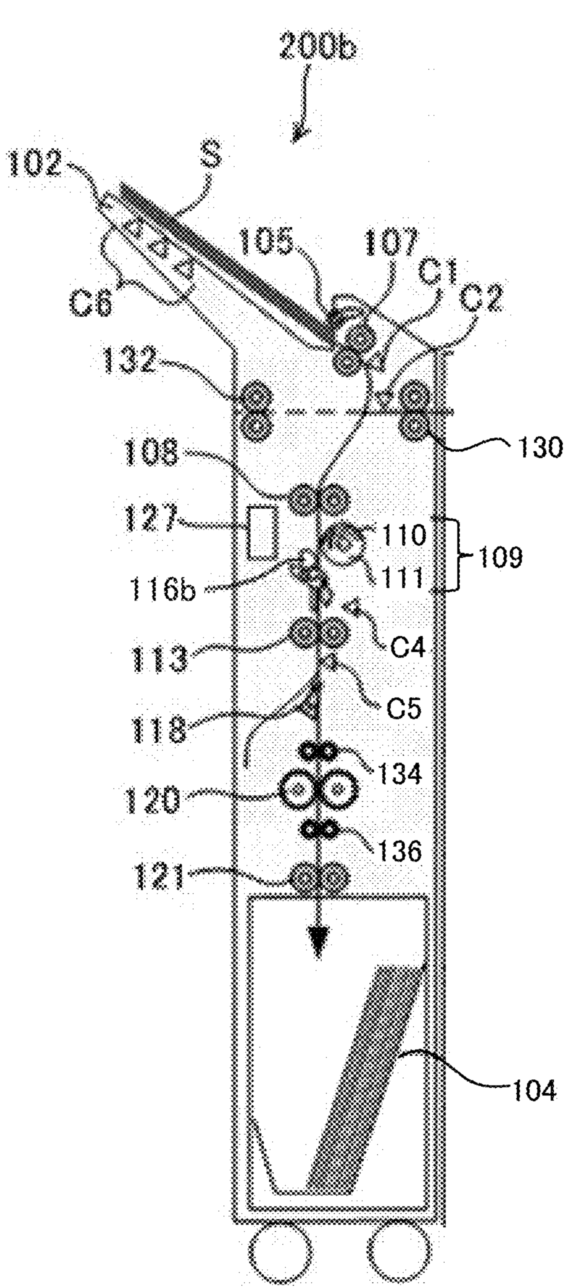
FIG. 29 is a diagram illustrating an overall configuration of a sheet laminator according to another embodiment of the present disclosure.

In the vertical-conveyance-type sheet laminator 200*b* included in the image forming system 5001 illustrated in FIG. 27 and the image forming system 5002 of FIG. 28, the conveyance passage (defined by, for example, the entrance roller pair 108, the winding roller 109, the thermal fixing roller pair 120, and the conveyance roller pair 136) in which the lamination sheet S and the inner sheet P are conveyed is disposed in the vertical direction, as illustrated in FIG. 29. Further, a lateral conveyance passage defined by two conveyance roller pairs 130 and 132 is disposed in the upper part of the sheet laminator 200*b*. The lateral conveyance passage is a conveyance passage to eject the inner sheet P that is conveyed from the image forming apparatus 500 without receiving the sheet inserting operation or the sheet laminating operation, directly from the sheet laminator 200*b*.

The sheet laminator 200*b* illustrated in FIG. 29 may be used not as a post-processing apparatus disposed in the image forming systems 5001 and 5002 but may be used as a single-unit (stand-alone) sheet laminator.

Figure 30:
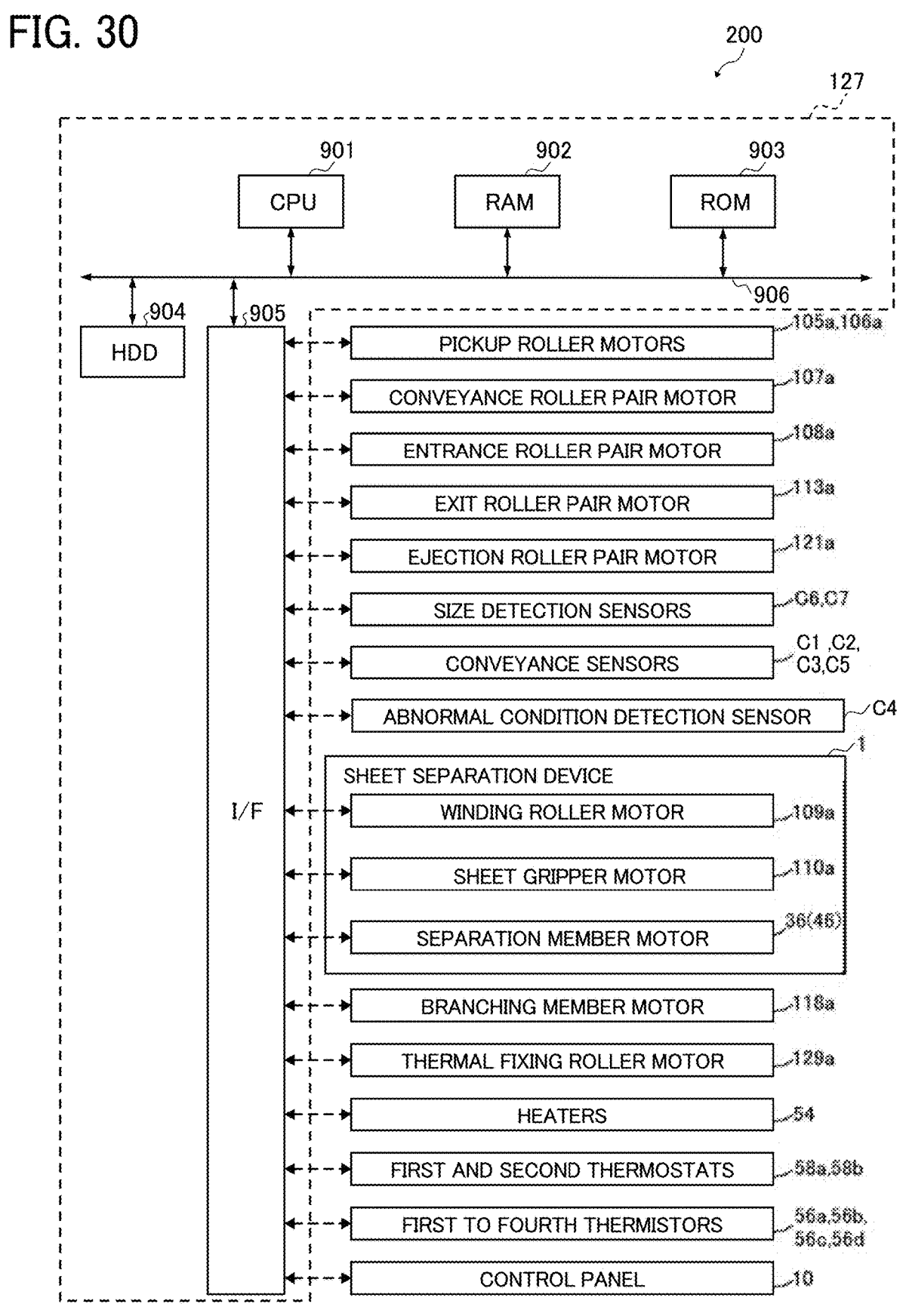

FIG. 30 is a block diagram illustrating a hardware configuration of a control block of the sheet laminator 200 to control the operation performed in the sheet laminator 200.

As illustrated in FIG. 30, the sheet laminator 200 includes a central processing unit (CPU) 901, a random access memory (RAM) 902, a read only memory (ROM) 903, a hard disk drive (HDD) 904, and an interface (I/F) 905. The CPU 901, the RAM 902, the ROM 903, the HDD 904, and the I/F 905 are coupled to each other via a common bus 906.

The CPU 901 is an arithmetic unit and controls the overall operations of the sheet laminator 200.

The RAM 902 is a volatile storage medium that allows data to be read and written at high speed. The CPU 901 uses the RAM 902 as a work area for data processing.

The ROM 903 is a read-only non-volatile storage medium that stores programs such as firmware.

The HDD 904 is a non-volatile storage medium that allows data to be read and written and has a relatively large storage capacity. The HDD 904 stores, e.g., an operating system (OS), various control programs, and application programs.

The sheet laminator 200 processes, by an arithmetic function of the CPU 901, e.g., a control program stored in the ROM 903 and an information processing program (or application program) loaded into the RAM 902. Such processing configures a software controller including various functional modules of the sheet laminator 200. The software controller thus configured cooperates with hardware resources of the sheet laminator 200 to construct functional blocks to implement functions of the sheet laminator 200. In other words, the CPU 901, the RAM 902, the ROM 903, the HDD 904, and the I/F 905 implement a controller 127 to control the operation of the sheet laminator 200.

The I/F 905 is an interface that connects a pickup roller motor 105*a*, a pickup roller motor 106*a*, a conveyance roller pair motor 107*a*, the entrance roller pair motor 108*a*, the exit roller pair motor 113*a*, an ejection roller pair motor 121*a*, the winding roller motor 109*a*, the sheet gripper motor 110*a*, the separation member motor 36 (46), a branching member motor 118*a*, a thermal fixing roller motor 129*a*, and a heater 54, to the common bus 906. Further, the I/F 905 is an interface that connects the size detection sensors C6 and C7, the sheet conveyance sensors C1, C2, and C3, the abnormal condition detection sensor C4, a first thermostat 58*a*, a second thermostat 58*b*, a first thermistor 56*a*, a second thermistor 56*b*, a third thermistor 56*c*, a fourth thermistor 56*d*, and the control panel 10, to the common bus 906.

The controller 127 controls the operations of the pickup roller motors 105*a* and 106*a*, the conveyance roller pair motor 107*a*, the entrance roller pair motor 108*a*, the exit roller pair motor 113*a*, the ejection roller pair motor 121*a*, the winding roller motor 109*a*, the sheet gripper motor 110*a*, the separation member motor 36 (46), the branching member motor 118*a*, the thermal fixing roller motor 129*a*, and the heater 54, via the I/F 905. Further, the controller 127 acquires detection results of the size detection sensors C6 and C7, the sheet conveyance sensors C1, C2, C3, and C5, the abnormal condition detection sensor C4, the first thermostat 58*a*, the second thermostat 58*c*, the first thermistor 56*a*, the second thermistor 56*b*, the third thermistor 56*c*, and the fourth thermistor 56*d* by the I/F 905.

The winding roller motor 109*a* is a driver to drive the winding roller 109 in the forward and reverse directions. The sheet gripper motor 110*a* is a driver to rotate the sheet gripper 110. The separation member motor 36 (46) is a driver to move the separation members 116*a* and 116*b* in the width direction of the lamination sheet S. The branching member motor 118*a* is a driver to switch the position of the branching member 118.

Figure 31C:
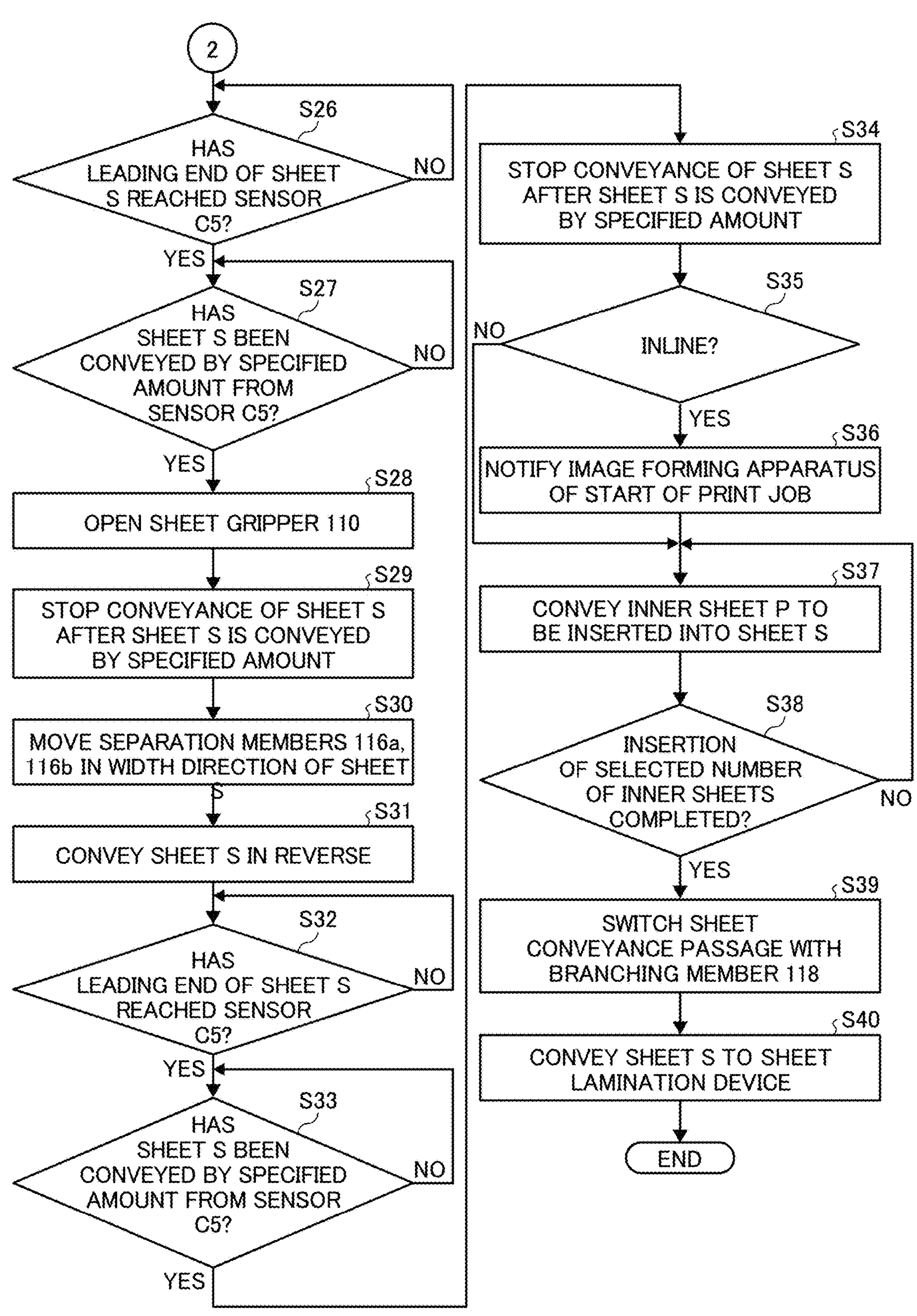

FIG. 31 including FIGS. 31A, 31B, and 31C is a flowchart of a series of operations performed by the image forming system 3001 illustrated in FIG. 25, from feeding a lamination sheet S, inserting an inner sheet P, and completing lamination of the lamination sheet S with the inner sheet P being inserted.

A description is given of the series of operations, with reference to the reference numerals indicated in the flowchart of FIG. 31 including FIGS. 31A, 31B, and 31C.

In the following description, only the sheet laminating operation in the image forming system 3001 illustrated in FIG. 25 is described. However, the sheet laminating operations in the image forming system 4001 illustrated in FIG. 26, the image forming system 5001 illustrated in FIG. 27, and the image forming system 5002 illustrated in FIG. 28 are similar to the image forming system 3001 illustrated in FIG. 25, and thus the detailed description is omitted.

First, in step S01, the image forming system 3001 determines whether a user has selected the multiple sheet insertion mode. When the user has selected the multiple sheet insertion mode (YES in step S01), the image forming system 3001 requests the user inputting the number of inner sheets in step S02. The number of inner sheets can be set by the user with, for example, the control panel 10.

On the other hand, when the user has not selected the multiple sheet insertion mode (NO in step S01), the image forming system 3001 determines whether the user has selected the single sheet insertion mode with one inner sheet in step S03.

Subsequent to step S02 or step S03, the controller 127 of the sheet laminator 200*a* starts feeding a lamination sheet S (see FIG. 1), in step S11. Then, in step S12, the controller 127 of the sheet laminator 200*a* determines whether the leading end of the lamination sheet S has reached the sheet conveyance sensor C3 (see FIG. 2). When the leading end of the lamination sheet S has not reached the sheet conveyance sensor C3 (NO in step S12), step S12 is repeated until the lamination sheet S reaches the sheet conveyance sensor C3. On the other hand, when the leading end of the lamination sheet S has reached the sheet conveyance sensor C3 (YES in step S12), the process proceeds to step S13. In step S13, the controller 127 of the sheet laminator 200*a* determines whether the lamination sheet S has been conveyed by the specified amount from the sheet conveyance sensor C3, and temporarily stops the conveyance (see FIG. 3). When the lamination sheet S has not been conveyed by the specified amount from the sheet conveyance sensor C3 (NO in step S13), step S13 is repeated until the lamination sheet S is conveyed by the specified amount from the sheet conveyance sensor C3. On the other hand, when the lamination sheet S has been conveyed by the specified amount from the sheet conveyance sensor C3 (YES in step S13), the controller 127 of the sheet laminator 200*a* causes the sheet gripper motor 110*a* to open the sheet gripper 110 in step S14, and conveys the lamination sheet S in the opposite conveyance direction (i.e., the direction indicated by arrow B in FIG. 4) in step S15 (see FIG. 4).

Then, the controller 127 of the sheet laminator 200*a* determines whether the lamination sheet S has been conveyed by the specified amount in step S16. When the lamination sheet S has not been conveyed by the specified amount (NO in step S16), step S16 is repeated until the lamination sheet S is conveyed by the specified amount. On the other hand, when the lamination sheet S has been conveyed by the specified amount (YES in step S16), the controller 127 of the sheet laminator 200*a* temporarily stops the conveyance after the lamination sheet S is conveyed by the specified amount in step S17. Then, in step S18, the controller 127 of the sheet laminator 200*a* causes the sheet gripper motor 110*a* to close the sheet gripper 110 to nip the end of the lamination sheet S (see FIG. 5).

Then, in step S19, the controller 127 of the sheet laminator 200*a* causes the winding roller motor 109*a* to rotate the winding roller 109 in the counterclockwise direction, so that the lamination sheet S is would around the winding roller 109 (see FIG. 6). In step S20, the controller 127 of the sheet laminator 200*a* determines whether the leading end of the lamination sheet S has reached at the sheet conveyance sensor C5. When the leading end of the lamination sheet S has not reached the sheet conveyance sensor C5 (NO in step S20), step S20 is repeated until the leading end of the lamination sheet S reaches the sheet conveyance sensor C5. By contrast, when the leading end of the lamination sheet S has reached the sheet conveyance sensor C5 (YES in step S20), the sheet laminator 200*a* then executes the operation of step S21. In step S21, the controller 127 of the sheet laminator 200*a* determines whether the lamination sheet S has been conveyed by the specified amount from the sheet conveyance sensor C5. When the lamination sheet S has not been conveyed by the specified amount from the sheet conveyance sensor C5 (NO in step S21), step S21 is repeated until the lamination sheet S is conveyed by the specified amount from the sheet conveyance sensor C5. By contrast, when the lamination sheet S has been conveyed by the specified amount from the sheet conveyance sensor C5 (YES in step S21), the controller 127 of the sheet laminator 200*a* detects the condition of the lamination sheet S with the abnormal condition detection sensor C4 in step S22.

The abnormal condition detection sensor C4 is an abnormal condition detector that detects whether the dimension of the space "g" created between the two sheets of the lamination sheet S (the amount of bending of one of the two sheets) exceeds the predetermined threshold. In step S23, the controller 127 of the sheet laminator 200*a* determines whether the lamination sheet S is in a normal condition, in other words, the size of the space "g" is equal to or greater than the given threshold, from the detection result of the abnormal condition detection sensor C4. When the sheet laminator 200*a* determines that the lamination sheet S is in a normal condition (i.e., the size of the space "g" is equal to or greater than the given threshold) from the detection result of the abnormal condition detection sensor C4 (YES in step S23), the controller 127 of the sheet laminator 200*a* then executes the operation of step S24*a*.

On the other hand, when the controller 127 of the sheet laminator 200*a* determines that the lamination sheet S is in an abnormal condition (i.e., the size of the space "g" is smaller than the given threshold) from the detection result of the abnormal condition detection sensor C4 (NO in step S23), the controller 127 of the sheet laminator 200*a* notifies the user of the abnormal condition and stops the sheet processing operation in step S24*b*. Then, the process of the flowchart ends.

In step S24*a*, the controller 127 of the sheet laminator 200*a* conveys the lamination sheet S by the specified amount in a direction opposite to the sheet winding direction (i.e., the direction indicated by arrow A in FIG. 2), so that the bonding portion "r" of the lamination sheet S is located downstream from the nip region of the exit roller pair 113. Accordingly, the space "g" created between the two sheets of the lamination sheet S can be formed at a position corresponding to the insertion position of the separation members 116*a* and 116*b*. After step S24*a*, the sheet laminator 200*a* executes the operation of step S24*c*. In step S24*c*, the controller 127 of the sheet laminator 200*a* causes the separation member motor 36 to insert the separation members 116*a* and 116*b* from both sides of the lamination sheet S in the width direction of the lamination sheet S into the space "g" created between the two sheets of the lamination sheet S (see FIGS. 7 and 20). Then, in step S25, the controller 127 of the sheet laminator 200*a* causes the winding roller motor 109*a* to rotate the winding roller 109 in the clockwise direction with the separation members 116*a* and 116*b* inserted from both sides of the lamination sheet S, and convey the lamination sheet S in the forward conveyance direction (i.e., the direction indicated by arrow A in FIG. 2).

Then, in step S26, the controller 127 of the sheet laminator 200*a* determines whether the leading end of the lamination sheet S has reached the sheet conveyance sensor C5. When the leading end of the lamination sheet S has not reached the sheet conveyance sensor C5 (NO in step S26), step S26 is repeated until the leading end of the lamination sheet S reaches the sheet conveyance sensor C5. By contrast, when the leading end of lamination sheet S has reached the sheet conveyance sensor C5 (YES in step S26), the sheet laminator 200*a* executes the operation of step S27. In step S27, the sheet laminator 200*a* determines whether the lamination sheet S has been conveyed by the specified amount from the sheet conveyance sensor C5. When the lamination sheet S has not been conveyed by the specified amount from the sheet conveyance sensor C5 (NO in step S27), step S27 is repeated until the lamination sheet S is conveyed by the specified amount from the sheet conveyance sensor C5. By contrast, when the lamination sheet S has been conveyed by the specified amount from the sheet conveyance sensor C5 (YES in step S27), the sheet laminator 200*a* the sheet gripper motor 110*a* to open the sheet gripper 110 in step S28.

In step S29, the controller 127 of the sheet laminator 200*a* conveys the lamination sheet S by the specified amount, then temporarily stops the conveyance of the lamination sheet S. Then, in step S30, the controller 127 of the sheet laminator 200*a* causes the separation member motor 36 to further move the separation members 116*a* and 116*b* in the width direction of the lamination sheet S (see FIGS. 8 and 22). As a result, the trailing ends of the two sheets of the lamination sheet S are separated into the upper and lower sheets.

In step S31, the sheet laminator 200*a* conveys the lamination sheet S in the opposite conveyance direction (i.e., the direction indicated by arrow B in FIG. 9). Then, in step S32, the controller 127 of the sheet laminator 200*a* determines whether the leading end of the lamination sheet S in the forward conveyance direction has reached the sheet conveyance sensor C5. When the leading end of the lamination sheet S has not reached the sheet conveyance sensor C5 (NO in step S32), step S32 is repeated until the leading end of the lamination sheet S reaches the sheet conveyance sensor C5. By contrast, when the leading end of lamination sheet S has reached the sheet conveyance sensor C5 (YES in step S32), the sheet laminator 200*a* then executes the operation of step S33. In step S33, the controller 127 of the sheet laminator 200*a* determines whether the lamination sheet S has been conveyed by a specified amount from the sheet conveyance sensor C5. When the lamination sheet S has not been conveyed by the specified amount from the sheet conveyance sensor C5 (NO in step S33), step S33 is repeated until the lamination sheet S is conveyed by the specified amount from the sheet conveyance sensor C5. By contrast, when the lamination sheet S has been conveyed by the specified amount from the sheet conveyance sensor C5 (YES in step S33), the sheet laminator 200*a* temporarily stops the conveyance of the lamination sheet S in step S34 (see FIG. 9). As a result, the separation of the lamination sheet S is completed. In other words, one sheet (first sheet S1) of the two sheets of the lamination sheet S is guided to the first branched conveyance passage K1, and the other sheet (second sheet S2) is guided to the second branched conveyance passage K2. The configuration and operation of each of the branched conveyance passages K1 and K2 according to the present embodiment are described in further detail below, with reference to FIGS. 32A to 34B.

Subsequently, in step S35, the controller 127 of the sheet laminator 200*a* determines whether to perform the image forming operation (with an inline image forming apparatus) on the inner sheet P to be inserted into the lamination sheet S. When the image forming operation is performed with an inline image forming apparatus (YES in step S35), the sheet laminator 200*a* sends a signal to notify the inline image forming apparatus, for example, the image forming apparatus 300 (or the image forming apparatus 400 or the image forming apparatus 500) to start the print job (printing operation) to form an image on the inner sheet P in step S36. Then, the sheet laminator 200*a* executes the operation of step S37.

By contrast, when the image forming operation is not performed with an inline image forming apparatus (NO in step S35), the sheet laminator 200*a* then executes the operation of step S37.

In step S37, the sheet laminator 200*a* conveys the inner sheet P in the forward conveyance direction (i.e., the direction indicated by arrow A in FIG. 10), so as to insert the inner sheet P into the opening of the lamination sheet S. In step S37, when the single sheet insertion mode is selected, the sheet laminator 200*a* performs the operations illustrated in FIGS. 10 to 12. On the other hand, when the multiple sheet insertion mode is selected, the sheet laminator 200*a* performs the operations illustrated in FIGS. 13 to 16.

In step S38, the controller 127 of the sheet laminator 200*a* determines whether the selected number of inner sheets P is completely inserted into the lamination sheet S. When the selected number of inner sheets P are not inserted into the lamination sheet S (NO in step S38), step S38 is repeated until the selected number of inner sheets P are inserted into the lamination sheet S. On the other hand, when the selected number of inner sheets P are inserted into the lamination sheet S (YES in step S38), the sheet laminator 200*a* then executes the operation of step S39.

Then, in step S39, the controller 127 of the sheet laminator 200*a* causes the branching member motor 118*a* to rotate the branching member 118 to switch (change) the sheet conveyance passage of the lamination sheet S with the separation members 116*a* and 116*b*. In step S40, the sheet laminator 200*a* conveys the lamination sheet S nipping the inner sheet P between the two sheets of the lamination sheet S to the sheet lamination device 50 (thermal fixer). By application of heat and pressure to the lamination sheet S, the sheet laminating operation completes (see FIG. 17).

When the image forming operation is performed with an inline image forming apparatus (YES in step S35), the sheet laminator 200*a* sends a signal to notify the inline image forming apparatus, for example, the image forming apparatus 300 (or the image forming apparatus 400 or the image forming apparatus 500) to start the print job, then performs the printing operation on the inner sheet P and conveys the inner sheet P. In this case, the sheet processing apparatus 100 waits until the printed inner sheet P is conveyed and reaches the sheet conveyance sensor C1. The sheet laminator 200*a* may send the image forming apparatus 300 (or the image forming apparatus 400 or the image forming apparatus 500) the signal to start the print job in advance based on a time to convey the printed inner sheet P, for example, after the separation members 116*a* and 116*b* complete the operations illustrated in FIG. 7. Due to such a configuration, the productivity can be enhanced.

A detailed description is now given of the configuration and functions of a sheet processing apparatus 100 according to an embodiment of the present disclosure, with reference to FIGS. 32A to 34B.

Figures 32A, 32B:
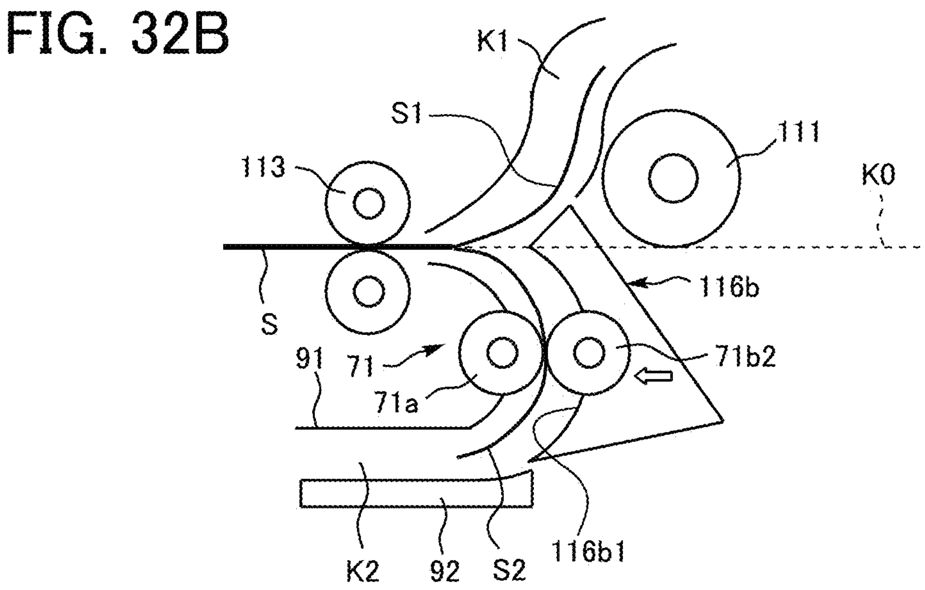
FIGS. 32A and 32B are diagrams illustrating operations of a branched passage conveyance roller pair disposed in a branched conveyance passage.

FIGS. 32A and 32B are diagrams illustrating operations of a branched passage conveyance roller pair disposed in a branched conveyance passage.

Figure 33A:
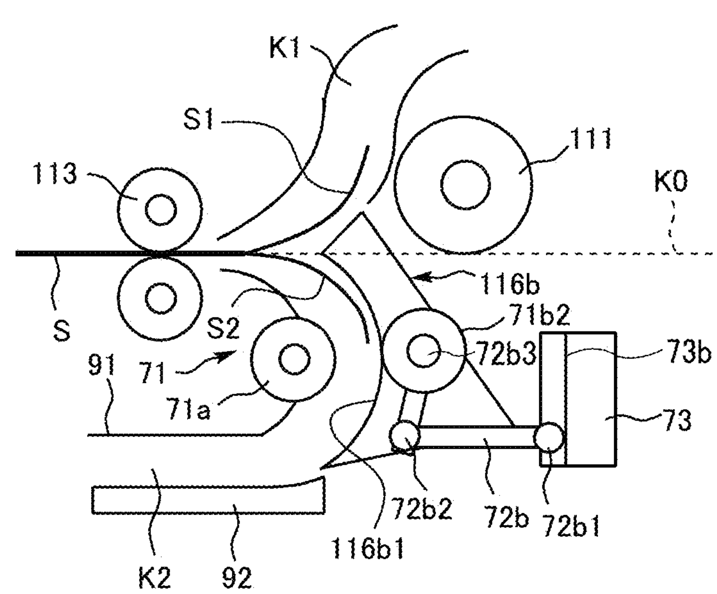
FIGS. 33A and 33B are diagrams illustrating operations of a contact and separation mechanism that contacts and separates the branched passage conveyance roller pair.
Figure 33B:
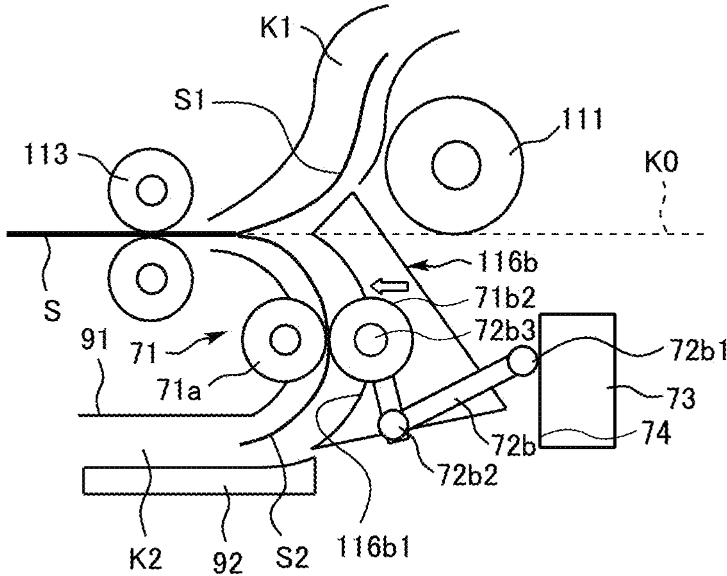
Figure 35:
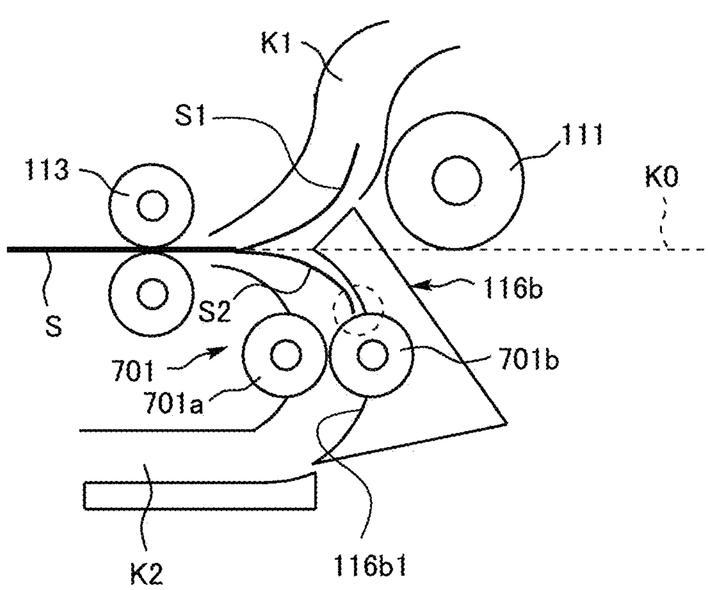
FIG. 35 is a diagram illustrating an example of a movement of a two-ply sheet in a branched conveyance passage, as a comparative example.

FIGS. 33A and 33B are diagrams illustrating operations of a contact and separation mechanism that contacts and separates the branched passage conveyance roller pair.

Figures 34A, 34B:
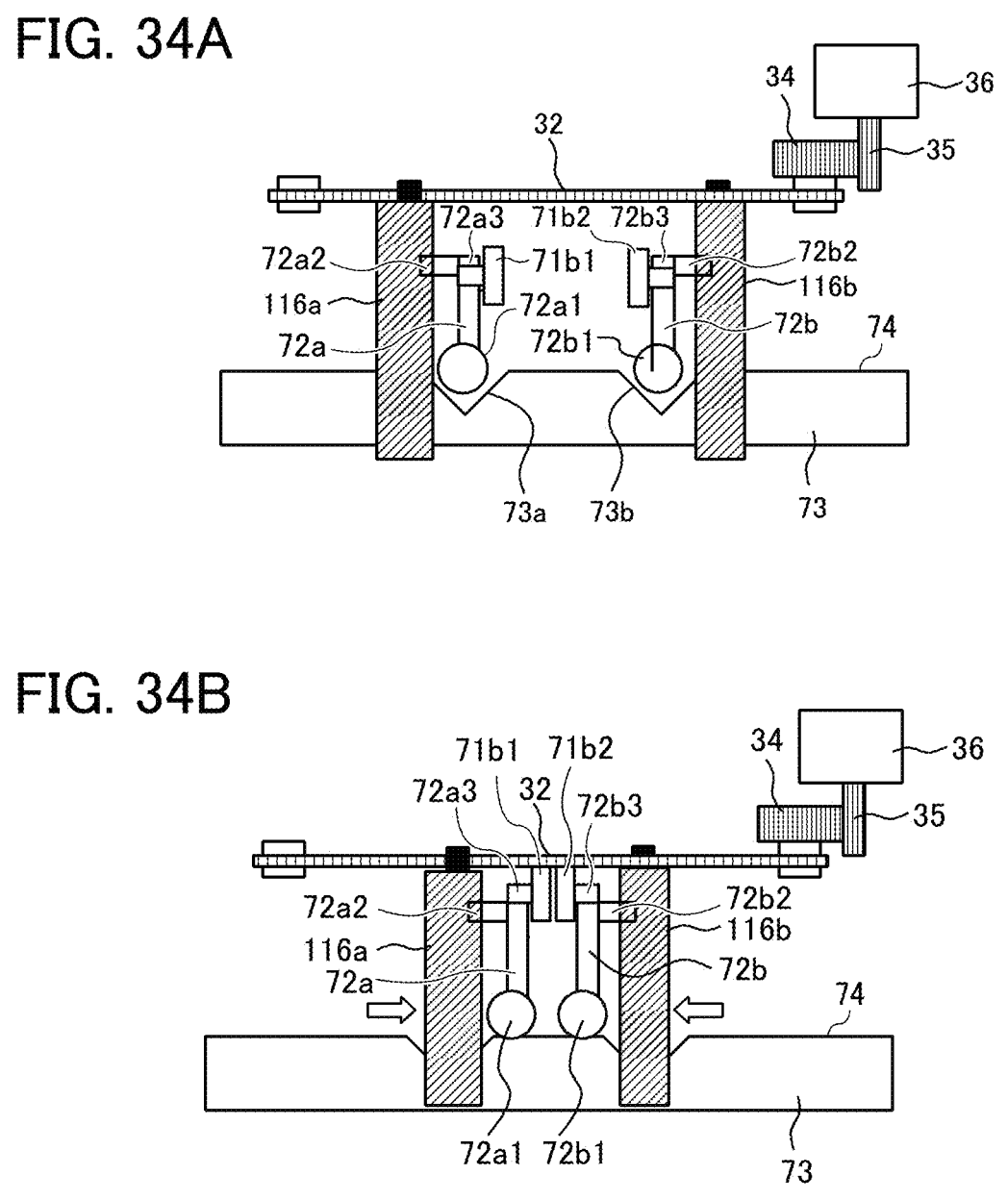

FIGS. 34A and 34B are schematic diagrams illustrating the operations of the contact and separation mechanism of FIGS. 33A and 33B, viewed from above.

As described above, the sheet processing apparatus 100 according to the present embodiment includes the sheet separation device 1 that separates the non-bonding portion of the lamination sheet S (two-ply sheet) in which two sheets, which are the first sheet P1 and the second sheet P2, are overlapped and bonded together at the bonding portion “r” of the lamination sheet S. The sheet separation device 1 conveys (performs branched conveyance on) one sheet (first sheet S1) of the two sheets peeled (separated) from each other of the lamination sheet S to the first branched conveyance passage K1 and the other sheet (second sheet S2) of the two sheets to the second branched conveyance passage K2 that is a branched conveyance passage branched in a direction different from the first branched conveyance passage K1. Specifically, as described above with reference to FIGS. 7 to 9, the separation members 116*a* and 116*b* are inserted between the first sheet S1 and the second sheet S2 to separate the first sheet S1 and the second sheet S2 to a small extent, and eventually the first sheet S1 and the second sheet S2 are conveyed to the first branched conveyance passage K1 and the second branched conveyance passage K2, respectively, to be largely separated from each other.

Referring to the drawings including FIGS. 32A and 32B, the first branched conveyance passage K1 and the second branched conveyance passage K2 are disposed on the opposite sides across a main conveyance passage K0 that functions as a conveyance passage in which the lamination sheet S is conveyed before the sheet separating operation. To be more specific, the first branched conveyance passage K1 is branched to the upper side of the main conveyance passage K0 (to the right side in FIGS. 32A to 33B), and the second branched conveyance passage K2 is branched to the lower side of the main conveyance passage K0 (to the left side in FIGS. 32A to 33B).

Further, the two branched conveyance passages, which are the first branched conveyance passage K1 and the second branched conveyance passage K2, according to the present embodiment correspond to the branched conveyance passages illustrated in FIG. 23C among FIGS. 23A, 23B, and 23C used for the above-described configuration.

Further, the exit roller pair 113 is disposed downstream from the portion where the first branched conveyance passage K1 and the second branched conveyance passage K2 meet, in the forward conveyance direction. Further, the exit roller pair 113 functions as a conveyance roller pair to convey the two sheets (the first sheet S1 and the second sheet S2) separated from each other toward the first branched conveyance passage K1 and the second branched conveyance passage K2, respectively. Specifically, the exit roller pair 113 rotates in the reverse direction, so that the lamination sheet S with the first sheet S1 and the second sheet S2 separated from each other by the separation members 116*a* and 116*b* can be conveyed in the opposite conveyance direction. As a result, due to the operation of the separation members 116*a* and 116*b*, of the first sheet S1 and the second sheet S2 separated from each other, the first sheet S1 is branched and guided to the first branched conveyance passage K1, and the second sheet S2 is branched and guided to the second branched conveyance passage K2.

The first sheet S1 and the second sheet S2 of the lamination sheet S (two-ply sheet) in the present embodiment are bonded with the adhesive (used to bond the first sheet S1 and the second sheet S2 in the sheet laminating operation). The glue is put only on the inner face of the second sheet S2, in other words, the face of the second sheet S2 opposite to the first sheet S1).

As illustrated in FIGS. 32A and 32B, the sheet processing apparatus 100 according to the present embodiment employs the separation members 116*a* and 116*b*. The separation members 116*a* and 116*b* have branching guide faces 116*a*1 and 116*b*1, respectively, that are inwardly curved faces along which the second sheet S (corresponding sheet of the two sheets of the lamination sheet S) conveyed to the second branched conveyance passage K2 (branched conveyance passage) is guided in the second branched conveyance passage K2. FIGS. 32A and 32B illustrate the separation member 116*b* alone.

Similar to the separation members 116*a* and 116*b* described above with reference to FIGS. 7 to 9, the separation members 116*a* and 116*b* move in the width direction of the lamination sheet S (the direction orthogonal to the drawing sheet in FIGS. 32A, 32B, 33A, and 33B and the left-and-right direction in FIGS. 34A and 34B) to perform the sheet separating operation on the two sheets (the first sheet S1 and the second sheet S2) of the lamination sheet S. As a result, the separation members 116*a* and 116*b* according to the present embodiment has the function that guides the second sheet S in the second branched conveyance passage K2 in addition to the function that performs the sheet separating operation.

The second branched conveyance passage K2 has a curved guide plate 91 and a guide plate 92. The curved guide plate 91 has an outwardly curved face disposed facing the inwardly-curved branching guide faces 116*a*1 and 116*b*1 of the separation members 116*a* and 116*b* with a substantial gap. The guide plate 92 is disposed facing a planar guide face of the curved guide plate 91.

As described above, the separation members 116*a* and 116*b* in the present embodiment functions as a guide in the second branched conveyance passage K2 in addition to a separator. Due to such a configuration, the sheet processing apparatus 100 according to the present embodiment can reduce the cost and save the space, when compared with a configuration including a guide separately disposed from a separator.

Further, the sheet processing apparatus 100 according to the present embodiment has a relatively large interval between the branching guide plates in the second branched conveyance passage K2 (i.e., the interval between the branching guide faces 116*a*1 and 116*b*1 and the curved guide face of the curved guide plate 91). Due to such a configuration, the failure (conveyance failure) that the second sheet S2 (the inner face of which is applied with the adhesive) is less likely to be caught in the second branched conveyance passage K2.

In the present embodiment, the sheet processing apparatus 100 includes a branched passage conveyance roller pair 71 as a conveyance roller pair having two rollers contact and separate from each other in at least one of the first branched conveyance passage K1 or the second branched conveyance passage K2. In other words, the sheet processing apparatus 100 according to the present embodiment includes the branched passage conveyance roller pair 71 only on the second branched conveyance passage K2.

Specifically, the branched passage conveyance roller pair 71 as a conveyance roller pair includes a fixed roller 71*a*, a contact and separation mechanism, a first movable roller 71*b*1 and a second movable roller 71*b*2. The contact and separation mechanism includes levers 72 and a rail 73 as illustrated in FIGS. 33A and 33B. Each of the first movable roller 71*b*1 and the second movable roller 71*b*2 contacts or separates from the fixed roller 71*a* by the contact and separation mechanism.

The fixed roller 71*a* functions as a drive roller that is driven by a driving mechanism to rotate in the counterclockwise direction in FIG. 32B. The fixed roller 71*a* is rotatably supported by the housing of the sheet processing apparatus 100.

On the other hand, each of the first movable roller 71*b*1 and the second movable roller 71*b*2 functions as a driven roller disposed in contact with the fixed roller 71*a* (as a drive roller) as illustrated in FIG. 32B. The first movable roller 71*b*1 and the second movable roller 71*b*2 are rotated with the fixed roller 71*a* in the counterclockwise direction in FIG. 32B. This position is a contact position.

Since the branched passage conveyance roller pair 71 is disposed on the second branched conveyance passage K2 as described above, even if the sheet processing apparatus 100 according to the present embodiment has the relatively large interval between the branching guide plates in the second branched conveyance passage K2 (i.e., the interval between the branching guide faces 116*a*1 and 116*b*1 and the curved guide face of the curved guide plate 91), the failure that deteriorates the sheet conveyance performance of the second sheet S2 is less likely to occur.

In the present embodiment, the first branched conveyance passage K1 does not includes the branched passage conveyance roller pair 71, which is different from the second branched conveyance passage K2, and includes two guide plates that are fixed at respective positions facing (opposite to) each other.

After the sheet (the second sheet S2 in the present embodiment) is conveyed to the branched conveyance passage (the second branched conveyance passage K2 in the present embodiment) and the leading end of the sheet in the sheet conveyance direction has passed the position of the branched passage conveyance roller pair 71, the branched passage conveyance roller pair 71 (as a conveyance roller pair) changes from the separated state (illustrated in FIG. 32A) to the contact state (illustrated in FIG. 32B) to nip and convey the second sheet S2. The leading end of the sheet in the sheet conveyance direction indicates the leading end of the sheet in the opposite conveyance direction and the portion enclosed by the broken line in FIG. 32A.

In other words, as illustrated in FIG. 32A, the second sheet S2 is conveyed in the second branched conveyance passage K2. When the leading end of the second sheet S2 (the portion enclosed by the broken line in FIG. 32A) is not at the position of the branched passage conveyance roller pair 71 (the position at which the branched passage conveyance roller pair 71 can nip the second sheet S2), the branched passage conveyance roller pair 71 is in the separated state in which the fixed roller 71*a* and each of the first movable roller 71*b*1 and the second movable roller 71*b*2 are separated from each other. This position is a separated position.

Then, as illustrated in FIG. 32B, when the leading end of the second sheet S2 reaches the position of the branched passage conveyance roller pair 71 (the position at which the branched passage conveyance roller pair 71 can nip the second sheet S2), the first movable roller 71*b*1 and the second movable roller 71*b*2 move in the direction indicated by the white arrow, and the branched passage conveyance roller pair 71 changes to the contact state. As a result, the second sheet S2 is conveyed downstream in the opposite conveyance direction in response to the rotation of the branched passage conveyance roller pair 71.

After completion of the branched conveyance of the sheet S1 in the first branched conveyance passage K1 and the second sheet S2 in the second branched conveyance passage K2, the exit roller pair 113 is rotated in the forward direction to perform so that the sheet inserting operation described above is performed 0 to 12 (the operation to insert the inner sheet P between the first sheet S1 and the sheet S2 of the lamination sheet S) is performed. At this time, the branched passage conveyance roller pair 71 is rotated in the opposite direction to the rotational direction when the first sheet S1 and the second sheet S2 are conveyed in the first branched conveyance passage K1 and the second branched conveyance passage K2, respectively, so that the second sheet S2 is conveyed in the forward conveyance direction. Further, the branched passage conveyance roller pair 71 at this time remains in the contact state until the trailing end of the second sheet S2 passes through the nip region of the branched passage conveyance roller pair 71.

As described above, the sheet processing apparatus 100 according to the present embodiment includes the branched passage conveyance roller pair 71 having the rollers that contact and separate from each other, in the second branched conveyance passage K2, and the branched passage conveyance roller pair 71 changes from the separated state to the contact state after the leading end of the second sheet S2 has passed through the position of the branched passage conveyance roller pair 71.

As a result, the two sheets, which are the first sheet S1 and the second sheet S2, of the lamination sheet S can be preferably separated and branched in the first branched conveyance passage K1 and the second branched conveyance passage K2.

More specifically, as illustrated in the comparative example in FIS. 35, a branched passage conveyance roller pair 701 has rollers that do not separate from each other and constantly in contact with each other. The branched passage conveyance roller pair 701 includes a drive roller 701*a* and a driven roller 701*b*, both of which are in respective fixed positions. When the branched passage conveyance roller pair 701 according to the comparative example is used, the second sheet S2 cannot be smoothly inserted between the nip region of the drive roller 701*a* and the driven roller 701*b* of the branched passage conveyance roller pair 701. As a result, this configuration is likely to cause a failure (conveyance failure) in which the leading end of the second sheet S2 contacts and is caught by the rollers. As a result of such a conveyance failure, the lamination sheet S cannot be sufficiently separated, and the inner sheet P cannot be preferably inserted to the lamination sheet S.

In contrast, the sheet processing apparatus 100 according to the present embodiment includes the branched passage conveyance roller pair 71, the rollers of which can contact and separate from each other. By so doing, the branched passage conveyance roller pair 71 changes from the separated state to the contact state after the leading end of the second sheet S2 has passed the position of the branched passage conveyance roller pair 71. As a result, such a failure is less likely to occur.

In particular, since the branched passage conveyance roller pair 71 according to the present embodiment includes the first movable roller 71*b*1 and the second movable roller 71*b*2 (each of which separates from the fixed roller 71*a*) as a driven roller, the configuration of the driving mechanism can be simpler when compared with a configuration having a movable roller as a drive roller.

In the present embodiment, of the first sheet S1 and the second sheet S2 of the lamination sheet S (two-ply sheet), the adhesive is applied only to the inner face of the second sheet S2. For this reason, the branched passage conveyance roller pair 71 whose rollers can contact and separate from each other is disposed only in the second branched conveyance passage K2 in which the second sheet S2 is conveyed.

In contrast, in a case where the adhesive is applied only to the inner face of the first sheet S1 or in a case where the conveyance failure is likely to occur when the first sheet S1 is conveyed in the first branched conveyance passage K1, the branched conveyance roller pair whose rollers can contact and separate from each other may be disposed only in the first branched conveyance passage K1 in which the first sheet S is conveyed.

Further, in a case where the adhesive is applied to the inner face of the first sheet S1 and the inner face of the second sheet S2 or in a case where the conveyance failure is likely to occur to the first sheet S1 and the second sheet S2 in the first branched conveyance passage K1 and the second branched conveyance passage K2, the branched conveyance roller pair whose rollers can contact and separate from each other may be disposed in both of the first branched conveyance passage K1 and the second branched conveyance passage K2.

Further, the two branched conveyance passages, which are the first branched conveyance passage K1 and the second branched conveyance passage K2, in the present embodiment correspond to the branched conveyance passages illustrated in FIG. 23C among FIGS. 23A, 23B, and 23C used for the above-described configuration. By contrast, the first branched conveyance passage K1 and the second branched conveyance passage K2 may be the branched conveyance passages illustrated in FIG. 23A or FIG. 23B. As described above, a branched passage conveyance roller pair whose rollers contact and separate from each other described above is disposed in the second branched conveyance passage K2 (or the first branched conveyance passage K1) to perform the sheet separating and contacting operations described above.

As illustrated in FIGS. 33A, 33B, 34A and 34B, in the present embodiment, the rollers of the branched passage conveyance roller pair 71 (as a conveyance roller pair) contact or separate from each other along with the movement of the separation members 116*a* and 116*b* in the width direction, as described above with reference to FIGS. 7 to 9 as described above.

The configuration illustrated in FIGS. 34A and 34B employs a movement mechanism that moves the separation members 116*a* and 116*b* in the width direction corresponding to the drive mechanism illustrated in FIG. 19A.

Further, as illustrated in FIGS. 33A, 33B, 34A and 34B, the contact and separation mechanism in which the movable rollers 71*b* (i.e., the first movable roller 71*b*1 and the second movable roller 71*b*2) moves to contact and separate with respect to the fixed roller 71*a* includes, for example, the levers 72 (i.e., a first lever 72*a* and a second lever 72*b*) and the rail 73.

The movable roller 71*b* includes the first movable roller 71*b*1 and the second movable roller 71*b*2 and is held by the separation members 116*a* and 116*b* to be movable in the direction in which the movable roller 71*b* (the first movable roller 71*b*1 and the second movable roller 71*b*2) contacts and separates with respect to the fixed roller 71*a*.

As illustrated in FIGS. 34A and 34B, the movable rollers 71 (the first movable roller 71*b*1 and the second movable roller 71*b*2) of the branched passage conveyance roller pair 71, the separation members 116*a* and 116*b*, and the levers 72 (the first lever 72*a* and the second lever 72*b*) of the contact and separation mechanism are disposed in two sets in the width direction of the lamination sheet S, in other words, the axial direction of the rail 73.

More specifically, as illustrated in FIGS. 33A and 33B, the first movable roller 71*b*1 and the second movable roller 71*b*2 are rotatably held on one end of each of the first lever 72*a* and the second lever 72*b*, each of which having a substantially V-shape. Each of the first lever 72*a* and the second lever 72*b* is supported by corresponding one of the separation members 116*a* and 116*b* and is rotatable about a first support shaft 72*a*3 and a second support shaft 72*b*3 at the center of the first lever 72*a* and the second lever 72*b*. Each of the first lever 72*a* and the second lever 72*b* is biased by a corresponding biasing member such as a torsion spring mounted on the first support shaft 72*a*2 and the second support shaft 72*b*2. The first contact portion 72*a*1 and the second contact portion 72*b*1 of the first lever 72*a* and the second lever 72*b* are in contact with the rail 73 that is fixedly attached to the housing of the sheet processing apparatus 100. As illustrated in FIGS. 34A and 34B, the rail 73 has a first groove 73*a* and a second groove 73*b* at positions apart from each other in the width direction of the lamination sheet S, in other words, the axial direction of the rail 73.

When the first contact portion 72*a*1 of the first lever 72*a* and the second contact portion 72*b*1 of the second lever 72*b* are in contact with the first groove 73*a* and the second groove 73*b* of the rail 73 as illustrated in FIG. 34A, the first movable roller 71*b*1 and the second movable roller 71*b*2 are in the separated state in which the first movable roller 71*b*1 and the second movable roller 71*b*2 are separated from the fixed roller 71*a* as illustrated in FIG. 33A. On the other hand, when the first contact portion 72*a*1 of the first lever 72*a* and the second contact portion 72*b*2 of the second lever 72*b* are out of the first groove 73*a* and the second groove 73*b* of the rail 73 and in contact with the planar face 74 of the rail 73 as illustrated in FIG. 34B, the first lever 72*a* and the second lever 72*b* that rotatably hold the first movable roller 71*b*1 and the second movable roller 71*b*2 rotate about the first support shaft 72*a*2 and the second support shaft 72*b*2, respectively, in the counterclockwise direction to become the contact state in which the first movable roller 71*b*1 and the second movable roller 71*b*2 are in contact with the fixed roller 71*a* as illustrated in FIG. 33B.

As described above, in the present embodiment, the contact and separation operations of the branched passage conveyance roller pair 71 (specifically, the fixing roller 71*a*, the first movable roller 71*b*1, and the second movable roller 71*b*2) is performed along with the lateral movement of the separation members 116*a* and 116*b* in the width direction of the lamination sheet S (the sheet separating operation), in other words, the contact and separation operations of the branched passage conveyance roller pair 71 and the lateral movement of the separation members 116*a* and 116*b* are driven by a common driving mechanism. Due to such a configuration, the sheet processing apparatus 100 according to the present embodiment can reduce the cost and save the space, when compared with a configuration in which the contact and separation operations of the branched passage conveyance roller pair 71 and the lateral movement of the separation members 116*a* and 116*b* are driven by separate driving mechanism.

The separation members 116*a* and 116*b* according to the present embodiment have the function that guides the second sheet S in the second branched conveyance passage K2 in addition to the function that performs the sheet separating operation. However, a separate guide can be included as a single guide unit. In this case, the first movable roller 71*b*1 and the second movable roller 71*b*2 are held by the separate guide.

As illustrated in FIG. 32A, the first movable roller 71*b*1 and the second movable roller 71*b*2 in the separated state with respect to the fixed roller 71*a* are separated to the position where the first movable roller 71*b*1 and the second movable roller 71*b*2 do not protrude from the branching guide faces 116*a*1 and 116*b*1 toward the fixed roller 71*a*.

In other words, when the first movable roller 71*b*1 and the second movable roller 71*b*2 are in the separated state with respect to the fixed roller 71*a*, no member is protruded to the branching guide faces 116*a*1 and 116*b*1 in the second branched conveyance passage K2.

Due to such a configuration, when the first movable roller 71*b*1 and the second movable roller 71*b*2 are in the separated state with respect to the fixed roller 71*a*, it is less likely that the leading end of the second sheet S2 is caught by the first movable roller 71*b*1 and the second movable roller 71*b*2.

As illustrated in FIGS. 32A and 32B, in the sheet processing apparatus 100 according to the present embodiment, the first movable roller 71*b*1 and the second movable roller 71*b*2 are disposed so that the first movable roller 71*b*1 and the second movable roller 71*b*2 can face or can be opposite to the second sheet S2 of the two sheets of the lamination sheet S, more specifically, the inner face of the second sheet S2 (the face of one sheet such as the second sheet S2 that is opposite to the other sheet such as the first sheet S1) to be conveyed to the second branched conveyance passage K2.

On the other hand, the fixed roller 71*a* is disposed so that the fixed roller 71*a* can face or can be opposite to the outer face of the second sheet S2 (the face of one sheet such as the second sheet S2 that is not opposite to the other sheet such as the first sheet S1).

In other words, the first movable roller 71*b*1 is disposed close to the branching guide face 116*a*1 of the separation member 116*a*, the second movable roller 71*b*2 is disposed close to the branching guide face 116*b*1 of the separation member 116*b*, and the fixed roller 71*a* is disposed close to the curved guide plate 91.

With this configuration, the second sheet S2 can be prevented from being caught in the second branched conveyance passage K2, when compared with a configuration in which the positions of the fixed roller 71*a* and each of the first movable roller 71*b*1 and the second movable roller 71*b*2 are switched from the above-described configuration of the present embodiment.

As described above, the sheet processing apparatus 100 according to the above-described embodiments includes the sheet separation device 1 that performs the sheet separating operation to separate the non-bonding portion of the lamination sheet S in which two sheets, which are the first sheet S1 and the second sheet S2, are overlapped and bonded together at the bonding portion "r" of the lamination sheet S. Further, the sheet separation device 1 conveys the first sheet S1 of the two sheets separated from each other to the first branched conveyance passage K1 and the second sheet S2 of the two sheets separated from each other to the second branched conveyance passage K2 that extends in the direction different from the direction of the first branched conveyance passage K1. Further, the branched passage conveyance roller pair 71 (as a conveyance roller pair) whose rollers contact and separate from each other is disposed in at least one conveyance passage (the second branched conveyance passage K2 in the present embodiment) of the first branched conveyance passage K1 or the second branched conveyance passage K2. After the leading end in the sheet conveyance direction of the second sheet S2 conveyed to the second branched conveyance passage K2 passes through the position of the branched passage conveyance roller pair 71, the branched passage conveyance roller pair 71 changes from the separated state to the contact state to nip and convey the second sheet S2.

As a result, the two sheets, which are the first sheet S1 and the second sheet S2, of the lamination sheet S can be preferably separated and conveyed in the first branched conveyance passage K1 and the second branched conveyance passage K2.

The present disclosure is not limited to the above-described embodiment and variations, and the configuration of the present embodiment can be appropriately modified other than suggested in the above embodiment and variations within a scope of the technological concept of the present disclosure. Further, the number, position, shape, and so forth of components are not limited to those of the present embodiment and variations, and may be the number, position, shape, and so forth that are suitable for implementing the present disclosure.

A description is now given of some aspects of the present disclosure.

Aspect 1

In Aspect 1, a sheet processing apparatus includes a conveyance passage, a sheet separation device, a conveyance roller pair, and circuitry. The conveyance passage conveys a two-ply sheet having two sheets overlapped and bonded together at a bonding portion in a conveyance direction. The conveyance passage includes a first branched conveyance passage branched in a first direction, and a second branched conveyance passage branched in a second direction different from the first direction. The sheet separation device separates a non-bonding portion of the two-ply sheet, convey a first sheet of the two sheets separated from each other to the first branched conveyance passage, and convey a second sheet of the two sheets separated from each other to the second branched conveyance passage. The conveyance roller pair has two rollers that contact and separate from each other and is disposed on at least one of the first branched conveyance passage or the second branched conveyance passage. The circuitry is to cause the conveyance roller pair to change the rollers from a separated state in which the two rollers are in contact with each other to a contact state in which the two rollers contact to each other, and grip and convey one of the first sheet and the second sheet conveyed to the at least one of the first branched conveyance passage or the second branched conveyance passage, after a leading end in the conveyance direction of one of the first sheet or the second sheet conveyed to the at least one of the first branched conveyance passage or the second branched conveyance passage passes a position of the conveyance roller pair.

Aspect 2

In Aspect 2, the sheet processing apparatus according to Aspect 1 further includes a separator. The circuitry is further to cause the separator to move in a width direction of the two-ply sheets, and insert between the two sheets of the two-ply sheet, and cause the conveyance roller pair to separate the two sheets of the two-ply sheet along with a movement of the separator in the width direction of the two-ply sheet.

Aspect 3

In Aspect 3, in the sheet processing apparatus according to Aspect 2, the separator has a branching guide face to guide one of the first sheet or the second sheet to the at least one of the first branched conveyance passage or the second branched conveyance passage. The conveyance roller pair includes a fixed roller, a contact and separation mechanism, and a movable roller to contact and separate with respect to the fixed roller by the contact and separation mechanism. The movable roller is supported to be movable in a direction in which the separator moves.

Aspect 4

In Aspect 4, in the sheet processing apparatus according to Aspect 3, the branching guide face includes an inward curved face.

Aspect 5

In Aspect 5, in the sheet processing apparatus according to Aspect 3 or 4, the movable roller in the separated state is separated to a position at which the movable roller is disposed behind the branching guide face and opposite to the fixed roller.

Aspect 6

In Aspect 6, in the sheet processing apparatus according to any one of Aspects 3 to 5, the movable roller is disposed facing an inner face of one of the first sheet or the second sheet conveyed to the at least one of the first branched conveyance passage or the second branched conveyance passage, the inner face facing the other sheet of the two sheets of the two-ply sheet, and the fixed roller is disposed facing an outer face of one of the first sheet or the second sheet. The outer face is an opposite side of the inner face.

Aspect 7

In Aspect 7, the sheet processing apparatus according to any one of Aspects 3 to 6 further includes a driving mechanism to rotate the conveyance roller pair. The fixed roller includes a drive roller rotated by the driving mechanism. The movable roller includes a driven roller rotated with the drive roller in contact with each other.

Aspect 8

In Aspect 8, in the sheet processing apparatus according to any one of Aspects 1 to 7, the sheet separation device performs a sheet inserting operation to insert an inner sheet between the two sheets separated from each other.

Aspect 9

In Aspect 9, the sheet processing apparatus according to Aspect 8, further a sheet lamination device to perform a sheet laminating operation on the two-ply sheet with the inner sheet inserted between the two sheets of the two-ply sheet by the sheet separation device.

Aspect 10

In Aspect 10, an image forming system includes the sheet processing apparatus according to any one of Aspects 1 to 9, and an image forming apparatus to form an image on an inner sheet to be conveyed to the sheet processing apparatus.

Aspect 11

In Aspect 11, a sheet processing apparatus includes a conveyance passage, a sheet separation device, and a conveyance roller pair. The conveyance passage conveys a two-ply sheet having two sheets overlapped and bonded together at a bonding portion in a conveyance direction. The conveyance passage includes a first branched conveyance passage branched in a first direction, and a second branched conveyance passage branched in a second direction different from the first direction. The sheet separation device separates a non-bonding portion of the two-ply sheet, conveys a first sheet of the two sheets separated from each other to the first branched conveyance passage, and conveys a second sheet of the two sheets separated from each other to the second branched conveyance passage. The conveyance roller pair has two rollers that are separable from and contactable with each other, and are disposed on at least one of the first branched conveyance passage or the second branched conveyance passage.

Aspect 12

In Aspect 12, the sheet processing apparatus according to Aspect 11 further includes circuitry to, in response to a passage of a leading end in one of the first direction and the second direction, of one of the first sheet and the second sheet conveyed to corresponding one of the first branched conveyance passage and the second branched conveyance passage, over a position of the conveyance roller pair, cause the conveyance roller pair to change a state of the two rollers from a separated state in which the two rollers are separated from each other to a contact state in which the two rollers are in contact with each other to grip the one of the first sheet and the second sheet, and convey the one of the first sheet and the second sheet, conveyed to corresponding one of the first branched conveyance passage and the second branched conveyance passage, in one of the first direction and the second direction.

Aspect 13

In Aspect 13, the sheet processing apparatus according to Aspect 12 further includes a separator. The circuitry is further to cause the separator to move in a width direction, orthogonal to the conveyance direction, of the two-ply sheets, and insert between the two sheets of the two-ply sheet to separate the two sheets of the two-ply sheet, and cause the conveyance roller pair to change the state of the two rollers between the separated state and the contact state in conjunction with a movement of the separator in the width direction.

Aspect 14

In Aspect 14, in the sheet processing apparatus according to Aspect 13, the separator has a branching guide face to guide the one of the first sheet and the second sheet to corresponding one of the first branched conveyance passage and the second branched conveyance passage. The conveyance roller pair includes a fixed roller corresponding as one roller of the two rollers, a movable roller corresponding as the other roller of the two rollers movable between a contact position to contact with the fixed roller in the contact state and a separated position separated from to the fixed roller in the separated state, and a contact-separation mechanism to move the movable roller between the contact position and the separated position. The separator movably supports the movable roller.

Aspect 15

In Aspect 15, in the sheet processing apparatus according to Aspect 14, the branching guide face includes an inward curved face.

Aspect 16

In Aspect 16, in the sheet processing apparatus according to Aspect 14 or 15, the movable roller in the separated state is separated to a position at which the movable roller is disposed behind the branching guide face and opposite to the fixed roller.

Aspect 17

In Aspect 17, in the sheet processing apparatus according to any one of Aspects 14 to 16, the movable roller is disposed facing an inner face of one of the first sheet or the second sheet conveyed to the at least one of the first branched conveyance passage or the second branched conveyance passage, the inner face facing the other sheet of the two sheets of the two-ply sheet, and the fixed roller is disposed facing an outer face of one of the first sheet or the second sheet. The outer face is an opposite side of the inner face.

Aspect 18

In Aspect 18, the sheet processing apparatus according to any one of Aspects 14 to 17 further includes a driving mechanism to rotate the conveyance roller pair. The fixed roller includes a drive roller rotated by the driving mechanism. The movable roller includes a driven roller rotated with the drive roller in contact with each other.

Aspect 19

In Aspect 19, in the sheet processing apparatus according to any one of Aspects 11 to 18, the sheet separation device performs a sheet inserting operation to insert an inner sheet between the two sheets separated from each other.

Aspect 20

In Aspect 20, the sheet processing apparatus according to Aspect 19, further a sheet lamination device to perform a sheet laminating operation on the two-ply sheet with the inner sheet inserted between the two sheets of the two-ply sheet by the sheet separation device.

Aspect 21

In Aspect 21, an image forming system includes the sheet processing apparatus according to any one of Aspects 11 to 20, and an image forming apparatus to form an image on an inner sheet to be conveyed to the sheet processing apparatus.

Aspect 22

In Aspect 22, a sheet laminator includes the sheet processing apparatus according to Aspect 11, and a thermal fixer to perform a sheet laminating operation on the two-ply sheet having the inner sheet inserted between the two sheets of the two-ply sheet by the sheet separation device.

Aspect 23

In Aspect 23, an image forming system includes the sheet laminator according to Aspect 22, and an image forming apparatus to form an image on an inner sheet to be conveyed to the sheet laminator.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet processing apparatus comprising:

a conveyance passage configured to convey a two-ply sheet having two sheets overlapped and bonded together at a bonding portion in a conveyance direction, the conveyance passage including a first branched conveyance passage branched in a first direction, and a second branched conveyance passage branched in a second direction different from the first direction;

a sheet separation device configured to separate a non-bonding portion of the two-ply sheet, convey a first sheet of the two sheets separated from each other to the first branched conveyance passage, and convey a second sheet of the two sheets separated from each other to the second branched conveyance passage, and the sheet separation device including a conveyance roller pair having two rollers, the two rollers being configured as separable from each other and contactable with each other, and the two rollers being disposed on at least one of the first branched conveyance passage or the second branched conveyance passage; and circuitry configured, in response to a passage of a leading end in one of the first direction and the second direction, of one of the first sheet and the second sheet conveyed to a corresponding one of the first branched conveyance passage and the second branched conveyance passage, over a position of the conveyance roller pair, to control the conveyance roller pair to change a state of the two rollers from a separated state in which the two rollers are separated from each other to a contact state in which the two rollers are in contact with each other to grip the one of the first sheet and the second sheet, and convey the one of the first sheet and the second sheet, conveyed to the corresponding one of the first branched conveyance passage and the second branched conveyance passage, in the one of the first direction and the second direction.

2. The sheet processing apparatus according to claim 1, further comprising a separator, wherein the circuitry is further configured to control the separator to move in a width direction, orthogonal to the conveyance direction, of the two-ply sheet, and insert between the two sheets of the two-ply sheet to separate the two sheets of the two-ply sheet; and control the conveyance roller pair to change the state of the two rollers between the separated state and the contact state in conjunction with a movement of the separator in the width direction.

3. The sheet processing apparatus according to claim 2, wherein the separator has a branching guide face configured to guide the one of the first sheet and the second sheet to the corresponding one of the first branched conveyance passage and the second branched conveyance passage, and the conveyance roller pair includes:

a fixed roller corresponding as one roller of the two rollers;

a movable roller corresponding as an other roller of the two rollers, the movable roller configured to be movable between a contact position to contact with the fixed roller in the contact state and a separated position separated from the fixed roller in the separated state; and a contact-separation mechanism configured to move the movable roller between the contact position and the separated position, and the separator is configured to movably support the movable roller.

4. The sheet processing apparatus according to claim 3, wherein the branching guide face includes an inwardly curved face.

5. The sheet processing apparatus according to claim 3, wherein the movable roller in the separated state is separated to a position at which the movable roller is disposed behind the branching guide face and opposite to the fixed roller.

6. The sheet processing apparatus according to claim 3, wherein the movable roller is disposed facing an inner face of the one of the first sheet and the second sheet conveyed to at least one of the first branched conveyance passage or the second branched conveyance passage, the inner face facing another one of the first sheet and the second sheet of the two sheets of the two-ply sheet, and the fixed roller is disposed facing an outer face of the one of the first sheet and the second sheet, the outer face being an opposite side of the inner face.

7. The sheet processing apparatus according to claim 3, further comprising a driving mechanism configured to rotate the conveyance roller pair, wherein the fixed roller includes a drive roller rotated by the driving mechanism, and the movable roller includes a driven roller rotated by the drive roller responsive to contact with the drive roller.

8. The sheet processing apparatus according to claim 1, wherein the sheet separation device is configured to perform a sheet inserting operation to insert an inner sheet between the two sheets separated from each other.

9. The sheet processing apparatus according to claim 8, further comprising a sheet lamination device configured to perform a sheet laminating operation on the two-ply sheet with the inner sheet inserted between the two sheets of the two-ply sheet by the sheet separation device.

10. An image forming system comprising:

the sheet processing apparatus according to claim 1; and an image forming apparatus configured to form an image on an inner sheet to be conveyed to the sheet processing apparatus.

11. A sheet laminator comprising:

the sheet processing apparatus according to claim 1; and a thermal fixer configured to perform a sheet laminating operation on the two-ply sheet having an inner sheet inserted between the two sheets.

12. An image forming system comprising:

the sheet laminator according to claim 11; and an image forming apparatus to form an image on the inner sheet to be conveyed to the sheet laminator.

13. A sheet processing apparatus comprising:

a conveyance passage configured to convey a two-ply sheet having two sheets overlapped and bonded together at a bonding portion in a conveyance direction, the conveyance passage including a first branched conveyance passage branched in a first direction, and a second branched conveyance passage branched in a second direction different from the first direction; and a sheet separation device configured to separate a non-bonding portion of the two-ply sheet, convey a first sheet of the two sheets separated from each other to the first branched conveyance passage, and convey a second sheet of the two sheets separated from each other to the second branched conveyance passage, and the sheet separation device comprising a first conveyance roller pair on the first branched conveyance passage, the first conveyance roller pair including a first fixed roller and a first movable roller, the first fixed roller and the first movable roller being configurable in a first contact state contacting each other or a first separation state not contacting each other, and a first contact and separation mechanism configured, responsive to conveyance of a first leading end of the first sheet in the first branched conveyance passage, to control the first movable roller to change the first fixed roller and the first movable roller from the first separation state to the first contact state to nip the first leading end of the first sheet.

14. The sheet processing apparatus according to claim 13, wherein the first fixed roller is a driving roller, and the first movable roller is driven by the first fixed roller during the first contact state.

15. The sheet processing apparatus according to claim 13, wherein the sheet separation device further comprises:

a second conveyance roller pair on the second branched conveyance passage, the second conveyance roller pair including a second fixed roller and a second movable roller, the second fixed roller and the second movable roller being configurable in a second contact state contacting each other or a second separation state not contacting each other, and a second contact and separation mechanism configured, responsive to conveyance of a second leading end of the second sheet in the second branched conveyance passage, to control the second movable roller to change the second fixed roller and the second movable roller from the second separation state to the second contact state to nip the second leading end of the second sheet.

16. The sheet processing apparatus according to claim 15, wherein the second fixed roller is a driving roller, and the second movable roller is driven by the second fixed roller during the second contact state.

17. The sheet processing apparatus according to claim 15, wherein the sheet separation device is configured to perform a sheet inserting operation to insert an inner sheet between the two sheets separated from each other.

18. The sheet processing apparatus according to claim 17, further comprising a sheet lamination device configured to perform a sheet laminating operation on the two-ply sheet with the inner sheet inserted between the two sheets of the two-ply sheet by the sheet separation device.

* * * * *